(12) United States Patent
Trukhan et al.

(10) Patent No.: US 11,192,066 B2
(45) Date of Patent: Dec. 7, 2021

(54) CATALYST COMPOSITE AND USE THEREOF IN THE SELECTIVE CATALYTIC REDUCTION OF $NO_x$

(71) Applicant: BASF Corporation, Florham Park, NJ (US)

(72) Inventors: Natalia Trukhan, Ludwigshafen (DE); Michaela Maltry, Ludwigshafen (DE); Ulrich Mueller, Ludwigshafen (DE); Stefan Marx, Ludwigshafen (DE); Karifala Dumbuya, Hannover (DE); Mathias Feyen, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 64 days.

(21) Appl. No.: 16/308,730

(22) PCT Filed: Jun. 7, 2017

(86) PCT No.: PCT/EP2017/063856
§ 371 (c)(1),
(2) Date: Dec. 10, 2018

(87) PCT Pub. No.: WO2017/216012
PCT Pub. Date: Dec. 21, 2017

(65) Prior Publication Data
US 2019/0143272 A1 May 16, 2019

(30) Foreign Application Priority Data
Jun. 13, 2016 (EP) .................................... 16174186

(51) Int. Cl.
*B01J 29/04* (2006.01)
*B01J 29/03* (2006.01)
*B01D 53/94* (2006.01)
*B01J 37/02* (2006.01)
*B01J 37/08* (2006.01)
(Continued)

(52) U.S. Cl.
CPC ..... *B01D 53/9418* (2013.01); *B01D 53/8628* (2013.01); *B01J 29/0308* (2013.01); *B01J 29/041* (2013.01); *B01J 29/763* (2013.01); *B01J 35/04* (2013.01); *B01J 35/1019* (2013.01); *B01J 35/1023* (2013.01); *B01J 35/1042* (2013.01); *B01J 35/1047* (2013.01); *B01J 35/1061* (2013.01); *B01J 37/0018* (2013.01); *B01J 37/0215* (2013.01); *B01J 37/0236* (2013.01); *B01J 37/0246* (2013.01); *B01J 37/086* (2013.01); *B01J 37/10* (2013.01); *C01B 39/48* (2013.01); *F01N 3/2066* (2013.01); *F01N 3/2825* (2013.01); *F01N 3/2828* (2013.01); *F01N 3/2832* (2013.01); *B01D 2251/2062* (2013.01); *B01D 2251/2067* (2013.01); *B01D 2255/2092* (2013.01); *B01D 2255/50* (2013.01); *B01D 2255/705* (2013.01); *B01D 2255/9205* (2013.01); *B01D 2255/9207* (2013.01); *B01D 2258/012* (2013.01); *B01J 31/1691* (2013.01); *B01J 31/2239* (2013.01); *B01J 2229/186* (2013.01); *B01J 2229/20* (2013.01); *B01J 2229/40* (2013.01); *B01J 2229/42* (2013.01); *B01J 2231/62* (2013.01); *B01J 2531/0216* (2013.01); *B01J 2531/31* (2013.01); *B01J 2531/48* (2013.01); *C01P 2002/72* (2013.01);
(Continued)

(58) Field of Classification Search
None
See application file for complete search history.

(56) References Cited

U.S. PATENT DOCUMENTS 6,506,703 B1 * 1/2003 Kao ....................... B01J 29/068
502/64
8,617,474 B2 * 12/2013 Bull .......................... B01J 35/04
422/171
(Continued)

FOREIGN PATENT DOCUMENTS

CA 2 951 064 A1 12/2015
CN 101920213 A 12/2010
(Continued)

OTHER PUBLICATIONS

Chen, Cong-Yan et al. "Studies on mesoporous materials . . . ". ScienceDirect. Microporous Materials, vol. 2, issue 1. p. 17-26 (1993). (Year: 1993).*
U.S. Appl. No. 15/509,527, filed Mar. 8, 2017, US 2017-0246620 A1, Parvulescu, A.-N., et al.
U.S. Appl. No. 15/550,581, filed Aug. 11, 2017, US 2018-0036723 A1, Riedel, D., et al.
U.S. Appl. No. 15/316,220, filed Dec. 5, 2016, US 2018-0134570 A1, Maurer, S., et al.
U.S. Appl. No. 16/202,918, filed Nov. 28, 2018, Maurer, S., et al.
(Continued)

*Primary Examiner* — Sheng H Davis
(74) *Attorney, Agent, or Firm* — Finnegan, Henderson, Farabow, Garrett & Dunner LLP

(57) ABSTRACT

The present invention relates to a process for the preparation of a catalyst for selective catalytic reduction comprising • (i) preparing a mixture comprising a metal-organic framework material comprising an ion of a metal or metalloid selected from groups 2-5, groups 7-9, and groups 11-14 of the Periodic Table of the Elements, and at least one at least monodentate organic compound, a zeolitic material containing a metal as a non-framework element, optionally a solvent system, and optionally a pasting agent, • (ii) calcining of the mixture obtained in (i); and further relates to a catalyst per se comprising a composite material containing an amorphous mesoporous metal and/or metalloid oxide and a zeolitic material, wherein the zeolitic material contains a metal as non-framework element, as well as to the use of said catalyst.

19 Claims, 4 Drawing Sheets

(51) Int. Cl.
| | |
|---|---|
| *B01J 37/10* | (2006.01) |
| *B01D 53/86* | (2006.01) |
| *B01J 29/76* | (2006.01) |
| *B01J 35/04* | (2006.01) |
| *B01J 35/10* | (2006.01) |
| *C01B 39/48* | (2006.01) |
| *B01J 37/00* | (2006.01) |
| *F01N 3/20* | (2006.01) |
| *F01N 3/28* | (2006.01) |
| *B01J 31/16* | (2006.01) |
| *B01J 31/22* | (2006.01) |

(52) U.S. Cl.
CPC ...... *F01N 2330/18* (2013.01); *F01N 2370/04* (2013.01); *F01N 2510/063* (2013.01)

(56) References Cited

U.S. PATENT DOCUMENTS

| | | | |
|---|---|---|---|
| 2007/0149385 A1* | 6/2007 | Liu | B01J 35/0006 502/60 |
| 2009/0214397 A1* | 8/2009 | Shirono | B01J 23/30 422/177 |
| 2009/0305040 A1 | 12/2009 | Schubert et al. | |
| 2010/0217055 A1* | 8/2010 | Tanaka | C10G 45/02 585/310 |
| 2010/0251700 A1* | 10/2010 | Wan | F01N 3/0231 60/287 |
| 2011/0076229 A1 | 3/2011 | Trukhan et al. | |
| 2012/0082864 A1 | 4/2012 | Leung et al. | |
| 2013/0202524 A1 | 8/2013 | Maurer et al. | |
| 2015/0065337 A1 | 3/2015 | Sato et al. | |
| 2015/0367337 A1 | 12/2015 | Yang et al. | |
| 2017/0008915 A1 | 1/2017 | Yaghi et al. | |

FOREIGN PATENT DOCUMENTS

| | | |
|---|---|---|
| CN | 103418239 | 12/2013 |
| CN | 103752168 A | 4/2014 |
| CN | 103752169 A | 4/2014 |
| EP | 2 845 648 A2 | 3/2015 |
| RU | 2 397 811 C2 | 8/2010 |
| RU | 2 577 856 C2 | 3/2016 |
| WO | WO 2008/129024 A1 | 10/2008 |
| WO | WO 2009/141324 A1 | 11/2009 |
| WO | WO 2013/118063 A1 | 8/2013 |
| WO | WO 2015/127033 A1 | 8/2015 |
| WO | WO 2015/185625 A2 | 12/2015 |

OTHER PUBLICATIONS

U.S. Appl. No. 62/081,243, filed Nov. 18, 2014, Trukhan, N., et al.
U.S. Appl. No. 15/549,905, filed Aug. 9, 2017, US 2018-0022611 A1, Feyen, M., et al.
U.S. Appl. No. 15/752,991, filed Feb. 15, 2018, US 2018-0243691 A1, Mueller, U., et al.
U.S. Appl. No. 15/518,945, filed Apr. 13, 2017, US 2017-0225959 A1, Maurer, S., et al.
U.S. Appl. No. 15/524,484, filed May 4, 2017, US 2017-0336030 A1, Weickert, M., et al.
U.S. Appl. No. 15/779,218, filed May 25, 2018, US 2018-0345245 A1, Maurer, S., et al.
U.S. Appl. No. 15/521,924, filed Apr. 26, 2017, US 2018-0230117 A1, Teles, J.H., et al.
U.S. Appl. No. 15/508,725, filed Mar. 3, 2017, US 2017-0275076 A1, Edgington, T, et al.
U.S. Appl. No. 15/744,324, filed Jan. 12, 2018, US 2018-0208532 A1, Parvulescu, A.-N., et al.
U.S. Appl. No. 16/086,251, filed Sep. 18, 2018, Kalo, B.
U.S. Appl. No. 15/571,107, filed Nov. 1, 2017, US 2018-0170850 A1, Vautravers, N., et al.
U.S. Appl. No. 15/779,314, filed May 25, 2018, US 2018-0333696 A1, Burckhart, J., et al.
U.S. Appl. No. 15/748,501, filed Jan. 29, 2018, US 2018-0214824 A1, Dumbuya, K., et al.
U.S. Appl. No. 16/060,260, filed Jun. 7, 2018, US 2018-0362353 A1, Vautravers, N., et al.
U.S. Appl. No. 16/076,600, filed Aug. 8, 2018, Riedel, D., et al.
U.S. Appl. No. 15/757,384, filed Mar. 5, 2018, US 2019-0022584 A1, Hilgendorff, M., et al.
U.S. Appl. No. 16/308,730, filed Dec. 10, 2018, Trukhan, N., et al.
U.S. Appl. No. 15/775,657, filed May 11, 2018, US 2018-0328601 A1, Weickert, M., et al.
U.S. Appl. No. 16/060,739, filed Jun. 8, 2018, US 2018-0362357 A1, Feyen, M., et al.
U.S. Appl. No. 16/060,229, filed Jun. 7, 2018, US 2018-0362351 A1, Parvulescu, A.-N., et al.
U.S. Appl. No. 16/304,511, filed Nov. 26, 2018, Feyen, M., et al.
Zhang, L., et al., "Rational Design of High-Performance DeNO$_x$ Catalysts Based on Mn$_x$Co$_{3-x}$O$_4$ Nanocages Derived from metal-organic Frameworks", ACS Catalysis, vol. 4 No. 6, 2014, pp. 1753-1763.
Loiland, J.A., et al., "Low temperature catalytic NO oxidation over microporous materials", Journal of Catalysis, vol. 311, 2014, pp. 412-423.
Wang, P., et al., "Porous metal-organic framework MIL-100(Fe) as an efficient catalyst for the selective catalytic reduction of NO$_x$ with NH$_3$,", RSC Advances, vol. 4 No. 90, 2004, p. 48912-48919.
Wang, P., et al., "Enhanced catalytic activity over MIL-100(Fe) loaded ceria catalysts for the selective catalytic reduction of NO$_x$ with NH$_3$ at low temperature", Journal of Hazardous Materials, vol. 301, 2016, pp. 512-521.
Jiang, H., et al., "Synthesis of highly efficient MnO$_x$ catalyst for low-temperature NH$_3$-SCR prepared from Mn-MOF-74 template", Materials Letters, vol. 168, 2016, pp. 17-19.
Zhang, T., et al., "Design and synthesis of core-shell structured meso-Cu-SSZ-13@mesoporous aluminosilicate catalyst for SCR of NO$_x$ with NH$_3$: Enhancement of activity, hydrothermal stability and propene poisoning resistance", Applied Catalysis B: Environmental, vol. 195, XP029556464, May 4, 2016, pp. 48-58.
Liu, Y., et al., "Structural and thermal stability of mesoporous alumina synthesized by Al-based coordination polymer", Microporous and Mesoporous Materials, XP055402602, vol. 165, Aug. 3, 2013, pp. 27-31.
Zifeng, Y., et al., "Yttria stabilized zirconia derived from metal-organic frameworks", RSC Advances, vol. 5, No. 14, Jan. 7, 2015, pp. 10619-10622.
International Search Report dated Sep. 18, 2017 in PCT/EP2017/063856, 5 pages.
G. M. Pancenkov, V. P. Lebedev, Chemical kinetics and catalysis, publisher Moscow University, 1961, p. 309.
Edler, Karen Jean. "Template Induction of Supramolecular Structure." (1997).
An English translation of comments from the Russian Office Action dated May 18, 2021, p. 2 providing comments on reference D12 (G. M. Pancenkov, V. P. Lebedev, Chemical kinetics and catalysis, publisher Moscow University, 1961, p. 309).

* cited by examiner

CATALYST COMPOSITE AND USE THEREOF IN THE SELECTIVE CATALYTIC REDUCTION OF $NO_x$

TECHNICAL FIELD

The present invention relates to a process for the preparation of a catalyst in particular for selective catalytic reduction as well as to the catalyst per se as obtainable or obtained according to the inventive process with contains a composite of an amorphous mesoporous metal and/or metalloid oxide and a zeolitic material containing a metal as non-framework element. Furthermore, the present invention relates to an exhaust gas treatment system containing the inventive catalyst as well as to a method for the selective catalytic reduction of $NO_x$ employing the inventive catalyst. Finally, the present invention relates to the use of the inventive catalyst in the treatment of exhaust gases, and preferably in the treatment of automotive exhaust gas.

INTRODUCTION

Zeolites containing copper and/or iron have found wide use in the field of selective catalytic reduction of nitrogen oxides ($NO_x$) contained in exhaust gases, and in particular in exhaust gas stemming from diesel engines and lean burn gasoline engines. Prominent examples of the zeolites which find use in these applications are copper and/or iron containing zeolites of the CHA and BEA structure types, and in particular chabazite and zeolite beta ion-exchanged with one or both of said metals.

Thus, WO 2009/141324 A1 relates to a process for the direct synthesis of Cu containing zeolites having CHA structure and to their use in the selective catalytic reduction of $NO_x$ in exhaust gas. WO 2013/118063 A1, on the other hand, concerns iron- and copper-containing zeolite beta from organotemplate-free synthesis and its use in the selective catalytic reduction of $NO_x$.

Efforts have however been made to find further materials which are also active and can thus be alternatively employed in the selective catalytic reduction of nitrogen oxides.

Zhang L. et al. in ACS Catalysis 2014, Volume 4, Number 6, pp. 1753-1763, relates to DeNOx catalysts based on $MnxCo_3$-$xO_4$ nanocages derived from metal-organic frameworks.

Loiland, J. A. et al. in Journal of Catalysis 2014, Volume 311, pp. 412-423, concerns the oxidation of NO over zeolites having the CHA-type framework structure in the proton (H+), sodium (Na+) and siliceous forms, over microporous carbons, as well as over the metal organic frame-work (MOF) material Basolite A100 at various temperatures.

CN 103752169 A relates to a process for the production of a copper benzene-1,3,5-tricarboxylate framework material and to its use as a catalyst for selective catalytic reduction of nitrogen oxide.

Wang, P. et al. in RSC Advances 2014, 4(90), pages 48912-48919 relates to the use of the metal-organic framework MIL-100(Fe) as an efficient catalyst for the selective catalytic reduction of NOx with $NH_3$. Furthermore, Wang, P. et al. in Journal of Hazardous Materials 2016, Volume 301, pages 512-521 concerns a catalyst based on nano-sized ceria encapsulated inside the pores of MIL-100(Fe) and to its use in the conversion of NOx with ammonia via selective catalytic reduction.

CN 103752168 A relates to a method for the preparation of an MIL-100-iron catalyst and to its use as a catalyst for ammonia selective catalytic reduction (SCR).

CN 101920213 A, on the other hand, concerns a catalyst for selective catalytic reduction (SCR) which employs a metal organic framework material as carrier for oxides chosen from manganese, iron, copper, vanadium and cerium as the catalytically active component.

WO 2008129024 A1 concerns a method for the preparation of an organometallic framework material loaded with catalyst metal components, where the metal ion of the framework material and the catalyst metal ion originate from different metals and the metal ion of the framework material is in the group of 2, 3, 4 or 13 of the periodic table of elements and the lanthanides.

CN 103418239 A relates to a catalytic metal organic framework material and to it use for ammonia selective catalytic reduction of nitrogen oxides (NOx).

Finally, Jiang, H. et al. in Materials Letters 2016, Volume 17, pages 17-19 relates to the synthesis of an $MnO_x$ catalyst prepared from a Mn-MOF-74 template and to its use in low-temperature ammonia-SCR.

In view of increasingly restrictive emissions regulations for $NO_x$ emissions, in particular in the field of automotive exhaust gas emissions, there is however an ongoing need for the provision of more efficient catalyst materials which are active in the fresh and aged states in order to meet current and future requirements and regulations. In particular, there is a need for new catalytic materials based on current zeolite technology which in combination with catalytic metals provide levels of exhaust gas treatment efficiencies which compare to the levels achieved by the current bench-mark catalysts yet may be obtained at lower cost and/or only necessitate a fraction of the catalytic metal loading currently required. Furthermore, there is a constant need for new zeolitic materials which outperform the currently used materials such as copper chabazite and iron zeolite beta.

DETAILED DESCRIPTION

It is therefore an object of the present invention to provide a catalyst for the selective catalytic reduction of $NO_x$ displaying an improved activity towards the reduction of $NO_x$ compared to the catalysts currently employed. Thus it has surprisingly been found that a catalyst for the selective catalytic reduction of $NO_x$ comprising a composite of an amorphous mesoporous metal and/or metalloid oxide and a zeolitic material containing a metal as non-framework element displays an improved $NO_x$ conversion activity compared to the activity of the zeolitic material alone, in particular at high operation temperatures. In addition thereto, it has quite unexpectedly been found, that the aforementioned improved $NO_x$ conversion activity is observed in the composite catalyst material after being subject to a harsh catalytic aging regimen.

Therefore, the present invention relates to a process for the preparation of a catalyst comprising
 (i) preparing a mixture comprising a metal-organic framework material comprising an ion of a metal or metalloid selected from groups 2-5, groups 7-9, and groups 11-14 of the Periodic Table of the Elements, preferably from groups 2-4, group 13, and group 14, and at least one at least monodentate organic compound,
  a zeolitic material containing a metal as a non-framework element,
  optionally a solvent system,
  and optionally a pasting agent,
 (ii) calcining of the mixture obtained in (i),
wherein preferably the metal-organic framework material comprises at least one at least bidentate organic compound.

According to the present invention, the mixture in (i) may be prepared in any suitable fashion provided that a homogeneous mixture of the metal-organic framework material and the zeolitic material is obtained. In preferred instances wherein the mixture further comprises a solvent system and/or a pasting agent, the mixture in (i) may accordingly be prepared in a fashion which affords a homogeneous mixture of the metal-organic framework material, the zeolitic material, and solvent system and/or paste agent. Thus, it is preferred according to the present invention that preparing the mixture in (i) includes homogenizing the mixture such as by type of agitation thereof such as by stirring, kneading, and/or sonication thereof, and preferably by kneading thereof.

Furthermore, the mixture prepared in (i) may be brought into any suitable shape or form prior to the calcination thereof. Thus, for example, the mixture and preferably the homogenized mixture, may be brought into a specific form in which it may then remain after having been subsequently calcined.

Therefore, it is preferred that (i) of the inventive process further comprises a step (i.a) homogenizing and shaping of the mixture obtained in (i) prior to calcination thereof in (ii).

Concerning the preferred shaping of the mixture obtained in (i), no restrictions apply relative to the method and/or apparatus which may be used to this effect. Thus, in principle, any suitable method and/or apparatus may be used, wherein it is preferred that shaping of the mixture obtained in (i) is effected by extrusion.

Independently thereof, and in particular in instances wherein the mixture paired in (i) further comprises a solvent system and/or a pasting agent, it is preferred that said mixture is dried prior to the calcination thereof in (ii). Therefore, it is further preferred according to the present invention that (i) of the inventive process further comprises a step (i.b) drying of the mixture obtained in (i) or (i.a).

As regards the temperature and/or duration of the preferred trying in (i.b), no particular restrictions apply such that suitable temperature and/or duration may be chosen provided that the mixture obtained in (i) or (i.a) may be dried to a certain extent. Thus, by way of example, drying in (i.b) may be effected at a temperature in the range of anywhere from 80 to 160° C. wherein it is preferred that said drying is effected at a temperature ranging from 100 to 140° C., and more preferably ranging from 110 to 130° C. Independently thereof, the duration of the preferred drying in (i.b) may range anywhere from 1 to 7 hours, wherein it is preferred that said drying is effected for a time in the range of from 4 to 6 hours, and more preferably in the range of from 4.5 to 5.5 hours.

Same applies accordingly relative to the calcining in (ii) such that in principle any suitable temperature and/or duration may be chosen provided that the mixture obtained in (i), (i.a), or (i.b) may be effectively calcined. Thus, by way of example, calcining in (ii) may be effected at a temperature ranging anywhere from 250 to 700° C., wherein preferably calcining in (ii) is effected at a temperature ranging from 400 to 640° C., and more preferably of from 450 to 590° C. According to the inventive process it is however particularly preferred that calcining in (ii) is effected at a temperature in the range of from 520 to 560° C. Independently thereof, the duration of the calcination in (ii) is again not in any way restricted provided that at the calcination temperature which is chosen the mixture obtained in (i), (i.a), or (i.b) may be effectively calcined. Thus, by way of example, calcining in (ii) may be effected at a temperature ranging anywhere from 3 to 7 h, wherein preferably the duration of the calcining in (ii) ranges from 4 to 6 h. According to the inventive process, it is particularly preferred that calcining in (ii) is effected for a duration ranging from 4.5 to 5.5 h.

As concerns the particular and preferred embodiments of the inventive process wherein the mixture prepared in (i) comprises a solvent system, there is in principle no restriction as to the amounts of the solvent system which may be used to this effect. Thus, by way of example, in instances wherein the mixture comprises a solvent system, the solids concentration of the mixture prepared in (i) may range anywhere from 25 to 75% by weight based on the total weight of the metal-organic framework material, of the zeolitic material containing a metal as a non-framework element, and of the solvent system, wherein preferably the solids concentration is in the range of from 30 to 70% by weight, more preferably 35 to 65% by weight, and more preferably 40 to 60% by weight. According to the inventive process it is particularly preferred that in instances wherein the mixture comprises a solvent system, the solids concentration of the mixture prepared in (i) is in the range of from 45 to 55% by weight based on the total weight of the metal-organic framework material, of the zeolitic material containing a metal as a non-framework element, and of the solvent system.

According to the present invention, however, the mixture obtained in (i) may alternatively be provided on a support substrate prior to calcination thereof.

Therefore, the present invention further relates to a process for the preparation of a catalyst comprising (i) preparing a mixture comprising a metal-organic framework material comprising an ion of a metal or metalloid selected from groups 2-5, groups 7-9, and groups 11-14 of the Periodic Table of the Elements, preferably from groups 2-4, group 13, and group 14, and at least one at least monodentate organic compound,
a zeolitic material containing a metal as a non-framework element,
optionally a solvent system,
and optionally a pasting agent;
(i.A) homogenizing the mixture obtained in (i), wherein the mixture comprises a solvent system;
(i.B) providing a support substrate;
(i.C) coating the support substrate provided in (i.B) with the homogenized mixture obtained in (i.A);
(i.D) optionally drying the coated support substrate obtained in (i.C);
(i.E) calcining of the coated support substrate obtained in (i.C) or (i.D), wherein preferably the metal-organic framework material comprises at least one at least bidentate organic compound.

As regards the temperature and/or duration of the preferred drying in (i.D), no particular restrictions apply such that suitable temperature and/or duration may be chosen provided that the oated support substrate obtained in (i.C) may be dried to a certain extent. Thus, by way of example, drying in (i.D) may be effected at a temperature in the range of anywhere from 50 to 220° C. wherein it is preferred that said drying is effected at a temperature ranging from 70 to 180° C., more preferably from 80 to 150° C., more preferably from 90 to 130° C., and more preferably from 100 to 125° C. According to the inventive process it is however particularly preferred that the drying in (i.D) is effected at a temperature in the range of from 110 to 120° C. Independently thereof, the duration of the preferred drying in (i.D) may range anywhere from 1 to 7 hours, wherein it is preferred that said drying is effected for a time in the range of from 4 to 6 hours, and more preferably in the range of from 4.5 to 5.5 hours.

Same applies accordingly relative to the calcining in (i.E) of the coated support substrate as obtained in (i.C) or (i.D) such that in principle any suitable temperature and/or duration may be chosen provided that the coated support substrate may be effectively calcined. Thus, by way of example, calcining in (i.E) of the coated support substrate as obtained in (i.C) or (i.D) may be effected at a temperature ranging anywhere from 300 to 750° C., wherein preferably calcining in (i.E) is effected at a temperature ranging from 325 to 650° C., more preferably from 350 to 600° C., more preferably from 375 to 550° C., and more preferably from 400 to 500° C. According to the inventive process it is however particularly preferred that calcining in (i.E) is effected at a temperature in the range of from 425 to 475° C. Independently thereof, the duration of the calcination in (i.E) of the coated support substrate as obtained in (i.C) or (i.D) is again not in any way restricted provided that at the calcination temperature which is chosen the coated support substrate may be effectively calcined. Thus, by way of example, calcining in (i.E) of the coated support substrate as obtained in (i.C) or (i.D) may be effected at a temperature ranging anywhere from 3 to 7 h, wherein preferably the duration of the calcining in (i.E) of the coated support substrate ranges from 4 to 6 h. According to the inventive process, it is particularly preferred that calcining in (i.E) is effected for a duration ranging from 4.5 to 5.5 h.

With respect to the solvent system which is provided in (i) in instances wherein a coated support substrate is prepared, no particular restrictions apply either with respect to the number of solvents which may be contained therein, nor with respect to the specific type of solvents which may be used. It is, however, preferred according to the inventive process that the solvent system comprises one or more solvents selected from the group consisting of alcohols, water, mixtures of two or more alcohols, and mixtures of water and one or more alcohols, wherein more preferably the solvent system comprises one or more solvents selected from the group consisting of $(C_1-C_6)$-alcohols, water, mixtures of two or more $(C_1-C_6)$-alcohols and mixtures of water and one or more $(C_1-C_6)$-alcohols, more preferably from the group consisting of $(C_1-C_4)$-alcohols, water, mixtures of two or more $(C_1-C_4)$-alcohols and mixtures of water and one or more $(C_1-C_4)$-alcohols, more preferably from the group consisting of methanol, ethanol, n-propanol, isopropanol, water and mixtures of two or more thereof, and more preferably from the group consisting of methanol, ethanol, water and mixtures of two or more thereof. According to the inventive process it is particularly preferred that the solvent system comprises water, and preferably comprises distilled water, wherein it is further preferred that the solvent system consists of water, and preferably consists of distilled water.

According to the inventive process, there is in principle no restriction as to the amounts of the solvent system which may be contained in the mixture obtained in (i) which is homogenized in (i.A). Thus, by way of example, the solids concentration of the mixture prepared in (i) which is homogenized in (i.A) may range anywhere from 15 to 50% by weight based on the total weight of the metal-organic framework material, of the zeolitic material containing a metal as a non-framework element, and of the solvent system, wherein preferably the solids concentration is in the range of from 20 to 40% by weight, and more preferably from 25 to 35%. According to the inventive process it is particularly preferred that in instances wherein the mixture comprises a solvent system, the solids concentration of the mixture prepared in (i) is in the range of from 28 to 30% by weight based on the total weight of the metal-organic framework material, of the zeolitic material containing a metal as a non-framework element, and of the solvent system.

It is preferred according to the inventive process that the mixture obtained in (i) which is homogenized in (i.A) comprises a pasting agent. According to said particular and preferred embodiments of the inventive process, there is again no restriction as to the amounts of the solvent system which may be contained in the mixture obtained in (i) which is homogenized in (i.A). Thus, by way of example, the solids concentration of the mixture prepared in (i) comprising a pasting agent which is homogenized in (i.A) may range anywhere from 10 to 70% by weight based on the total weight of the metal-organic framework material, of the zeoliitic material containing a metal as a non-framework element, and of the solvent system, wherein preferably the solids concentration is in the range of from 20 to 50% by weight, and more preferably from 30 to 40% by weight. According to the inventive process it is particularly preferred that in instances wherein the mixture comprises a solvent system, the solids concentration of the mixture prepared in (i) is in the range of from 32 to 36% by weight based on the total weight of the metalorganic framework material, of the zeolitic material containing a metal as a non-framework element, and of the solvent system.

In step (i.A) of the inventive process, the mixture obtained in (i) which comprises a solvent system is homogenized. According to the present invention, the mixture obtained in (i) may be homogenized in (i.A) in any suitable fashion provided that a homogeneous mixture of the metal-organic framework material, of the zeolitic material, and of the solvent system is obtained. Thus, homogenization of the mixture in (i.A) may be achieved by any suitable means such as agitation thereof such as by stirring, kneading, vibrating and/or sonication thereof. According to the inventive process it is however particularly preferred that the mixture obtained in (i) is homogenized in (i.A) by stirring thereof.

As regards the coating method which may be employed in (i.C) of the inventive process, no particular restrictions apply such that any suitable method may be applied to this effect provided that a coating of the mixture obtained in (i.A) is effectively provided on the substrate. It is, however, preferred according to the inventive process that coating of the support substrate in (i.C) is effected by spray coating and/or wash coating, wherein according to the inventive process it is particularly preferred that the coating of the support substrate is achieved by wash coating of the support substrate provided in (i.B) with the homogenized mixture obtained in (i.A). Independently thereof, there is no restriction according to the inventive process as to the number of coating steps which may be performed in (i.C) for providing a coating of the mixture obtained in (i.A) onto the support substrate such that the chosen method may be repeated once or several times. Thus, coating of the support substrate in (i.C) may be repeated once or more than once, and is preferably repeated once to five times. According to the inventive process it is however particularly preferred that coating of the support substrate in (i.C) is repeated once to five times, more preferably once to four times, more preferably once to three times, and more preferably once or twice, wherein more preferably, coating of the support substrate provided in (i.B) with the homogenized mixture obtained in (i.A) is repeated once.

Concerning the support substrate provided in (i.B) according to the process of the present invention, no particular restrictions apply such that any suitable support substrate may be provided to this effect, provided however that in (i.C) it may be coated with the homogenized mixture obtained in (i.A). In particular, the type of substrate which may be employed in (i.B) is restricted neither with respect to its shape nor with respect to the materials of which it consists. Thus, regarding the shape of the support substrate provided in (i.B) it may, by way of example, be selected from the group consisting of granules, pellets, meshes, rings, spheres, cylinders, hollow cylinders, monoliths and mixtures and combinations of two or more thereof, wherein preferably the support substrate is a monolith. According to the preferred inventive process, it is particularly preferred that the support substrate provided in (i.B) is a honeycomb monolith which is preferably a wall-flow or flow-through monolith, and preferably a wall-flow monolith, a wall-flow honeycomb monolith being particularly preferred according to the present invention. Independently thereof, the support substrate provided in (i.B) may comprise any suitable substance or substances, wherein preferably the support substrate comprises ceramic and/or metallic substances, and preferably comprises ceramic substances. Among the preferred ceramic substances, it is particularly preferred that the support substrate provided in (i.B) comprises one or more ceramic substances selected from the group consisting of alumina, silica, silicates, aluminosilicates, aluminotitanates, silicon carbide, cordierite, mullite, zirconium, spinels, magnesia, titania and mixtures of two or more thereof, more preferably from the group consisting of α-alumina, aluminotitanates, silicon carbide, cordierite and mixtures of two or more thereof, more preferably from the group consisting of $Al_2TiO_5$, SiC, cordierite and mixtures of two or more thereof. According to the preferred inventive process it is however particularly preferred that the support substrate provided in (i.B) comprises SiC, wherein more preferably the support substrate consists of SiC.

According to the the inventive process wherein the mixture prepared in (i) is provided on a support substrate, there is in principle no particular restriction as to the amount of the mixture which may be provided on the substrate. Thus, by way of example, the loading of the zeolitic material containing a metal as non-framework element on the support substrate may range anywhere from 0.01 to 15 $g/in^3$ based on the total volume of the uncoated support substrate, wherein preferably the loading is in the range of from 0.05 to 10 $g/in^3$, more preferably from 0.1 to 5 $g/in^3$, more preferably from 0.2 to 4 $g/in^3$, more preferably from 0.4 to 3.5 $g/in^3$, more preferably from 0.6 to 3 $g/in^3$, more preferably from 0.8 to 2.5 $g/in^3$, more preferably from 1 to 2 $g/in^3$, and more preferably from 1.2 to 1.8 $g/in^3$. According to the present invention it is particularly preferred that the loading of the zeolitic material containing a metal as non-framework element on the support substrate is in the range of from 1.4 to 1.6 $g/in^3$.

As regards the value of the loading of the zeolitic material containing a metal as non-framework element on the support substrate expressed in grams per cubic inch, it is noted that within the meaning of the present invention the weight in grams refers to the weight of the zeolitic material containing a metal as non-framework element and the volume expressed in cubic inches refers to the volume of the substrate and preferably of the uncoated substrate, wherein said volume includes any pores, cavities, and channels which may be present in the substrate form. In particular, in particularly preferred instances wherein a honeycomb monolith substrate is employed, the volume refers to the total volume of the honeycomb substrate including the channels contained therein.

Concerning the metal-organic framework material contained in the mixture prepared in (i), no particular restrictions apply according to the present invention such that in principle any conceivable metal-organic framework material may be contained in said mixture provided that it comprises an ion of a metal or metalloid selected from groups 2-5, groups 7-9, and groups 11-14 of the Periodic Table of the Elements, preferably from groups 2-4, group 13, and group 14, and at least one at least monodentate organic compound, preferably at least one at least bidentate organic compound. Thus, as regards the metal or metalloid ion comprised in the metalorganic framework and which constitutes a framework element, any suitable metal or metalloid ion may be employed provided that it may form a framework structure together with the at least monodentate and preferably bidentate organic compound. Thus, by way of example, the ion comprised in the metal-organic framework material may be an ion of a metal selected from the group consisting of Mg, Al, Ga, In, Ti, Zr, Hf, Cu, Zn, Fe, Mn, V, Co and combinations of two or more thereof, wherein preferably, the ion comprised in the metal-organic framework material is an ion of a metal selected from the group consisting of Al, Ga, In, Ti, Zr, Hf, and combinations of two or more thereof, and preferably selected from the group consisting of Al, Ga, Ti, Zr, and combinations of two or more thereof. According to the inventive process it is particularly preferred that the ion comprised in the metal-organic framework material is Al and/or Zr, preferably Al.

Same applies accordingly with respect to the at least monodentate and preferably at least bidentate organic compound comprised in the metal-organic framework material and constituting the framework structure together with the ion of a metal or metalloid selected from groups 2-5, groups 7-9, and groups 11-14 of the Periodic Table of the Elements. It is, however, preferred according to the inventive process that the at least monodentate organic compound is a monodentate organic compound, a bidentate organic compound, a tridentate organic compound, a tetradentate organic compound, or a mixture of two or more thereof. According to the inventive process it is further preferred that the at least monodentate organic compound is selected from the group consisting of respectively optionally at least partially deprotonated imidazoles, dicarboxylic acids, tricarboxylic acids, tetracarboxylic acids, and mixtures of two or more thereof, wherein more preferably the at least monodentate organic compound is selected from the group consisting of respectively optionally at least partially deprotonated imidazole, acetylenedicarboxylic acid, camphordicarboxylic acid, fumaric acid, succinic acid, benzenedicarboxylic acid, naphthalenedicarboxylic acid, biphenyldicarboxylic acid, pyrazinedicarboxylic acid, bipyridinedicarboxylic acid, benzenetricarboxylic acid, benzenetetracarboxylic acid, adamantanetetracarboxylic acid, dihydroxyterephthalic acid, and mixtures of two or more thereof. According to the inventive process it is however particularly preferred that the at least monodentate and preferably at least bidentate organic compound comprises optionally and at least partially deprotonated fumaric acid, wherein more preferably the at least monodentate and preferably at least bidentate organic compound of the metal-organic framework material is optionally at least partially deprotonated fumaric acid.

With respect to the metal contained in the zeolitic material of the mixture prepared in (i) as a non-framework element, any suitable metal may be employed to this effect, provided that it may be contained in the microporous channels of the zeolitic material. Thus, by way of example, the metal contained in the zeolitic material as non-framework element may be selected from the group consisting of the elements of groups 3 to 12 of the Periodic Table of the Elements, and combinations of two or more thereof, wherein the metal contained in the zeolitic material as non-framework element is preferably selected from the group consisting of Pt, Pd, Rh, Ir, Ru, Cu, Co, Cr, Mn, Ni, Fe, V, Nb, and combinations of two or more thereof, and more preferably selected from the group consisting of Cu, Co, Cr, Ni, Fe, and combinations of two or more thereof. According to the inventive process it is particularly preferred that the metal contained in the zeolitic material of the mixture prepared in (i) as non-framework element comprises Cu and/or Fe, and preferably Cu, wherein more preferably the zeolitic material contains Cu and/or Fe, preferably Cu as non-framework element.

As regards the amount of the metal comprised as non-framework element in the zeolitic material, any suitable amount may be employed according to the inventive process. Thus, by way of example, the total amount of the metal contained in the zeolitic material as a non-framework element may be in the range of from 0.1 to 15 wt.-% calculated as the metal element and based on 100 wt.-% of the calcined zeolitic material, wherein according to the inventive process the total amount of the metal contained in the zeolitic material as non-framework element is preferably in the range of from 0.3 to 12 wt.-%, more preferably from 0.5 to 10 wt.-%, more preferably from 0.8 to 8 wt.-%, more preferably from 1 to 6 wt.-%, more preferably from 1.3 to 5 wt.-%, more preferably from 1.5 to 4.5 wt.-%, more preferably from 1.8 to 4 wt.-%, more preferably from 2 to 3.5 wt.-%, and more preferably from 2.3 to 3.3 wt.-%. According to the inventive process it is particularly preferred that the total amount of the metal contained in the zeolitic material as a non-framework element is in the range of from 2.5 to 3 wt.-%. Within the meaning of the present invention, the term "calcined" relative to 100 wt.-% of the zeolitic material on which the loading of the metal as non-framework element therein is based refers to the zeolitic material after calcination under any of the particular and preferred conditions as defined in the present application, in particular relative to the temperature and duration of the calcination, respectively, wherein preferably the term "calcined" refers to the material after calcination in air by incremental heating at a rate of 2° C./min to 600° C. and holding the zeolitic material at that temperature for 6 h.

According to the present invention, there is no particular restriction as to how the metal contained in the zeolitic material as non-framework element has been introduced therein. Thus, the metal contained in the zeolitic material as non-framework element may be introduced therein using any suitable method, wherein the introduction is preferably effected by means of impregnation of the zeolitic material with a salt of the metal and/or by ion-exchange of the metal ion into the zeolitic material. According to the inventive process it is particularly preferred that the metal contained in the zeolitic material as non-framework element has been introduced into the zeolitic material by ion-exchange.

Concerning the zeolitic material as such which is contained in the mixture prepared in (i), no restrictions apply according to the inventive process such that any conceivable zeolitic material may be contained therein. According to the present invention it is however preferred that the framework of the zeolitic material comprises $YO_2$, and preferably that the framework of the zeolitic material comprises $YO_2$ and $X_2O_3$, wherein Y is a tetravalent element and X is a trivalent element. Thus, by way of example, Y may be selected from the group consisting of Si, Sn, Ti, Zr, Ge, and combinations of two or more thereof, wherein Y preferably comprises Si and/or Ge, and more preferably comprises Si. According to the inventive process it is particularly preferred that Y is Si and/or Ge, wherein Y is preferably Si. Same applies accordingly with respect to the trivalent element X preferably comprised as $X_2O_3$ in the framework of the zeolitic material. Thus, by way of example, X may be selected from the group consisting of Al, B, In, Ga, and combinations of two or more thereof, wherein X preferably comprises Al and/or Ga, and more preferably comprises Al. According to the inventive process it is however particularly preferred that X is Al and/or Ge, wherein more preferably X is Al.

Regarding the particular and preferred embodiments of the inventive process wherein the framework of the zeolitic material comprises both $YO_2$ and $X_2O_3$, no particular restrictions apply relative to the molar ratio in which $YO_2$ and $X_2O_3$ may be contained therein. Thus, by way of example, the zeolitic material may comprise $YO_2$ and $X_2O_3$, wherein the molar ratio of $YO_2:X_2O_3$ is in the range of from 5 to 100, wherein preferably the molar ratio of $YO_2:X_2O_3$ is in the range of from 10 to 50, more preferably from 20 to 35, and more preferably from 22 to 30. According to the inventive process it is particularly preferred that in instances wherein the framework of the zeolitic material contained in the mixture prepared in (i) comprises $YO_2$ and $X_2O_3$, the molar ratio of $YO_2:X_2O_3$ is in the range of from 23 to 27.

Furthermore, as regards the framework structure of the zeolitic material contained in the mixture prepared in (i), again no particular restrictions apply according to the inventive process such that the zeolitic material may have any type of framework structure. Thus, by way of example, the zeolitic material contained in the mixture prepared in (i) may have a framework structure of the type CAN, AEI, EMT, SAV, SZR, KFI, ERI, OFF, RTH, GME, AFX, SFW, BEA, CHA, FAU, FER, HEU, LEV, MEI, MEL, MFI, or MOR, wherein preferably the zeolitic material contained in the mixture prepared in (i) has a framework structure of the type AEI, GME, BEA, CHA, FAU, FER, HEU, LEV, MEI, MEL, MFI, or MOR, more preferably of the type AEI, GME, CHA, MFI, BEA, FAU, or MOR, and more preferably of the type CHA, AEI, or BEA. According to the inventive process it is, however, particularly preferred that the zeolitic material contained in the mixture prepared in (i) has a framework structure of the type CHA and/or AEI, wherein more preferably the zeolitic material has the CHA framework structure.

As concerns the solvent system contained or optionally contained in the mixture prepared in (i), no particular restrictions apply in this respect, such that any suitable solvent system may be employed to this effect, provided that the solvent system allows for the preferred homogenizing of the mixture, in particular in (i.A) and (i.a), respectively. It is, however, preferred according to the inventive process that the solvent system preferably contained in the mixture prepared in (i) comprises a polar protic solvent, a polar aprotic solvent, or a mixture thereof, wherein more preferably the solvent system comprises a compound selected from the group consisting of water, an alcohol, an acid, a ketone, an aldehyde, an ether, an ester, a phenol, N,N-dimethyl formamide, dimethylsulfoxide, and a mixture of two or more thereof, and more preferably comprises a compound selected from the group consisting of water, methanol, ethanol, acetic acid, N,N-dimethyl formamide, dimethylsulfoxide, and a mixture of two or more thereof. According to the inventive process it is particularly preferred that the solvent system preferably contained in the mixture prepared in (i) comprises water or deionized water, wherein it is particularly preferred that the solvent system consists of water or deionized water, preferably of deionized water.

As concerns the relative amounts of the components contained in the mixture prepared in (i), again, no particular restrictions apply according to the inventive process such that any suitable relative amounts of the components and in particular of the metal-organic framework material and of the zeolitic material as well as of the preferred solvent system and/or pasting agent may be contained in the mixture prepared in (i), provided that the relative amounts allow for the preferred homogenizing of the mixture, in particular in (i.A) and (i.a), respectively. Thus, as concerns the weight ratio of the metal-organic framework material to the zeolitic material respectively contained in the mixture prepared in (i), any suitable ratio may be chosen, such that by way of example the weight ratio of the metal-organic framework material to the zeolitic material in the mixture (i) may be in the range of anywhere from 0.001 to 1 wherein metal-organic framework material is calculated as the metal or metalloid oxide. According to the inventive process it is however preferred that the weight ratio of the metal-organic framework material calculated as the oxide of the to the zeolitic material containing a metal as a non-framework element in the mixture of (i) is in the range of from 0.01 to 0.75, more preferably in the range of from 0.025 to 0.5, more preferably in the range of from 0.05 to 0.35, more preferably in the range of from 0.075 to 0.25, more preferably in the range of from 0.1 to 0.2, and more preferably in the range of from 0.12 to 0.16. According to the inventive process it is particularly preferred that the weight ratio of the metal-organic framework material calculated as the oxide to the zeolitic material containing a metal as a non-framework element in the mixture of (i) is in the range of from 0.13 to 0.14.

According to the inventive process it is alternatively preferred that the weight ratio of the metal-organic framework material to the zeolitic material respectively contained in the mixture prepared in (i) is in the range of anywhere from 0.001 to 0.5 wherein metal-organic framework material is calculated as the metal or metalloid oxide. Furthermore, it is alternatively preferred that the weight ratio of the metal-organic framework material calculated as the oxide of the to the zeolitic material containing a metal as a non-framework element in the mixture of (i) is in the range of from 0.005 to 0.2, more preferably in the range of from 0.01 to 0.1, more preferably in the range of from 0.015 to 0.08, more preferably in the range of from 0.02 to 0.05, and more preferably in the range of from 0.023 to 0.04. According to the inventive process it is alternatively particularly preferred that the weight ratio of the metal-organic framework material calculated as the oxide to the zeolitic material containing a metal as a non-framework element in the mixture of (i) is in the range of from 0.025 to 0.035.

With respect to the pasting agent which is preferably contained in the mixture prepared in (i), again no particular restrictions apply concerning the amount and/or type of pasting agent which may be employed provided that it allows for the agglomeration of the mixture and in particular of the metal-organic framework material and of the zeolitic material contained therein. It is, however, preferred according to the inventive process that the pasting agent comprises an organic polymer, wherein more preferably the organic polymer is selected from the group consisting of polyalkyleneoxide, cellulose, starch, wallpaper plaster, polyacrylate, polymethacrylate, polyvinylaclohol, polyvinyl pyrrolidone, polyisobutene, polytetrahydrofuran, and a mixture of two or more thereof. According to the inventive process it is particularly preferred that the pasting agent preferably contained in the mixture prepared in (i) comprises polyethylene glycol wherein preferably polyethylene glycol is employed as the pasting agent preferably contained in the mixture prepared in (i).

Concerning the amount of pasting agent which is preferably employed for preparing the mixture in (i), again any suitable amount may be used such that, by way of example, the weight ratio of the metal-organic framework material to the pasting agent may be anywhere in the range of from 0.1 to 20, wherein preferably the weight ratio of the metal-organic framework material to the pasting agent is in the range of from 1 to 15, more preferably from 1.5 to 14.5, more preferably of from 2 to 12, more preferably of from 2.5 to 10.5, more preferably of from 3 to 9, more preferably of from 3.5 to 8.5, more preferably of from 4 to 8, more preferably of from 4.5 to 7.5, and more preferably of from 5 to 7. According to the inventive process it is particularly preferred that the weight ratio of the metal-organic framework material to the pasting agent is in the range of from 5.5 to 6.5.

Furthermore, as regards the relative amounts of the metal-organic frame of material and of the zeolitic serial containing a metal as non-framework element to the pasting agent, although no particular restrictions apply, it is preferred that the weight ratio of the sum of the weights of the metal-organic framework material and the zeolitic material containing a metal as a non-framework element to the pasting agent is in the range of from 30 to 10, more preferably of from 25 to 15, and more preferably of from 22.5 to 17.5. According to the present invention it is particularly preferred that the weight ratio of the sum of the weights of the metal-organic framework material and the zeolitic material containing a metal as a non-framework element to the pasting agent is in the range of from 20.5 to 19.5.

In addition to relating to a process for the production of a catalyst, the present invention further relates to a catalyst and in particular to a catalyst for selective catalytic reduction as obtained according to any of the particular and preferred embodiments the inventive process. Furthermore, the present invention also relates to the catalyst as obtainable according to any of the particular and preferred embodiments the inventive process, i.e. independently of the actual method according to which it was obtained yet corresponding to a catalyst for selective catalytic reduction as obtained according to the inventive process.

In addition to relating to a catalyst as obtained and/or obtainable according to the inventive process as defined in any of the particular and preferred embodiments of the present application, the present invention further relates to a catalyst per se comprising a composite material containing an amorphous mesoporous metal and/or metalloid oxide and a zeolitic material, wherein the zeolitic material contains a metal as non-framework element. According to the present invention it is however preferred that the aforementioned catalyst per se is obtained and/or obtainable according to the inventive process as defined in any of the particular and preferred embodiments thereof in the present application.

According to the present invention, the inventive catalyst comprises a composite material containing an amorphous mesoporous metal and/or metalloid oxide. As regards the specific porosity of the metal and/or metalloid oxide containing the inventive catalyst, no particular restrictions apply provided that it displays a mesoporosity, i.e. that it contains defined pores having an average pore size comprised in the range of from 2 to 50 nm. Within the meaning of the present invention, it is preferred that the values of the mean pore sizes and in particular of the mean pore sizes in the mesoporous range ranging from 2 to 50 nm are determined according to the ISO 15901-2:2006 standard. It is, however, preferred according to the present invention that the amorphous mesoporous metal and/or metalloid oxide contained in the inventive catalyst displays an average mesopore size in the range of 3 to 10 nm, i.e. an average pore size which is in the range of from 3 to 10 nm based on the porosity measured in the range of 2 nm to 50 nm, wherein preferably the average mesopore size is based on the porosity measured in the range of 3 nm to 50 nm. More preferably, the amorphous mesoporous metal and/or metalloid oxide displays an average mesopore size in the range of 3.5 to 8 nm, more preferably from 3.5 to 6 nm, more preferably from 3.5 to 5 nm, more preferably from 3.5 to 4.5 nm, and more preferably from 3.8 to 4.2 nm, were in the average mesopore size corresponds to the average pore size based on the porosity measured in the range of 2 nm to 50 nm, and preferably based on the porosity measured in the range of 3 nm to 50 nm, wherein the average pore size is determined according to ISO 15901-2:2006. Within the meaning of the present invention, the values of the average mesopore size, i.e. of the average pore size based on the porosity measured in the range of 2 nm to 50 nm, and preferably based on the porosity measured in the range of 3 nm to 50 nm, preferably refers to the porosity of the amorphous mesoporous metal and/or metalloid oxide as contained in the inventive catalyst. Alternatively, however, said values of the average mesopore size of the amorphous mesoporous metal and/or metalloid oxide referred to the amorphous mesoporous metal and/or metalloid oxide as such, i.e. prior to being incorporated into the inventive catalyst or as determined for the amorphous mesoporous metal and/or metalloid oxide prepared as such and in the absence of further components of the inventive catalyst and in particular in the absence of zeolitic material. Furthermore, as employed in the present application, the term "amorphous" indicates that the material does not display any notable crystallinity, i.e. does not display any defined reflections in its diffractogram as observed for an at least partly crystalline material, when analyzed by powder x-ray diffraction and in particular when analyzed according to the x-ray powder diffraction method specifically described in the experimental section of the present application.

The inventive catalyst is not particularly restricted relative to the components which may be contained therein in addition to the composite material containing an amorphous mesoporous metal and/or metalloid oxide and a zeolitic material. Accordingly, it is preferred according to the present invention that the catalyst further comprises a support substrate onto which the composite material is provided, wherein it is particularly preferred that the composite material containing an amorphous mesoporous metal and/or metalloid oxide and a zeolitic material is provided on a support substrate as a coating layer, wherein more preferably the composite material is provided as a washcoat layer onto the support substrate.

Concerning the support substrate onto which the composite material is preferably provided in the inventive catalyst, no particular restrictions apply such that any suitable support substrate may be provided to this effect. In particular, the type of substrate which may be contained in the inventive catalyst is restricted neither with respect to its shape nor with respect to the materials of which it consists. Thus, regarding the shape of the support substrate preferably contained in the inventive catalyst it may, by way of example, be selected from the group consisting of granules, pellets, meshes, rings, spheres, cylinders, hollow cylinders, monoliths and mixtures and combinations of two or more thereof, wherein preferably the support substrate is a monolith. According to the present invention, it is particularly preferred that the support substrate is a honeycomb monolith which is preferably a wall-flow or flow-through monolith, and preferably a wall-flow monolith, a wall-flow honeycomb monolith being particularly preferred according to the present invention. Independently thereof, the support substrate contained in the inventive catalyst may comprise any suitable substance or substances, wherein preferably the support substrate comprises ceramic and/or metallic substances, and preferably comprises ceramic substances. Among the preferred ceramic substances, it is particularly preferred that the support substrate comprises one or more ceramic substances selected from the group consisting of alumina, silica, silicates, aluminosilicates, aluminotitanates, silicon carbide, cordierite, mullite, zirconium, spinels, magnesia, titania and mixtures of two or more thereof, more preferably from the group consisting of α-alumina, aluminotitanates, silicon carbide, cordierite and mixtures of two or more thereof, more preferably from the group consisting of $Al_2TiO_5$, SiC, cordierite and mixtures of two or more thereof. According to the present invention it is however particularly preferred that the support substrate comprises SiC, wherein more preferably the support substrate consists of SiC.

According to the particular and preferred embodiments of the inventive catalyst wherein the composite material is provided on a support substrate, there is in principle no particular restriction as to the amount of the composite material which may be provided on the substrate. Thus, by way of example, the loading of the composite material containing an amorphous mesoporous metal and/or metalloid oxide and a zeolitic material on the support substrate may range anywhere from 0.01 to 15 $g/in^3$ based on the total volume of the uncoated support substrate, wherein preferably the loading is in the range of from 0.05 to 10 $g/in^3$, more preferably from 0.1 to 5 $g/in^3$, more preferably from 0.2 to 4 $g/in^3$, more preferably from 0.4 to 3.5 $g/in^3$, more preferably from 0.6 to 3.3 $g/in^3$, more preferably from 0.8 to 2.5 $g/in^3$, more preferably from 1 to 2 $g/in^3$, and more preferably from 1.2 to 1.8 $g/in^3$. According to the present invention it is particularly preferred that the loading of the zeolitic material containing a metal as non-framework element on the support substrate is in the range of from 1.4 to 1.6 $g/in^3$.

As regards the weight ratio of the amorphous mesoporous metal and/or metalloid oxide to the zeolitic material containing a metal as non-framework element in the inventive catalyst, no particular restrictions apply, such that said weight ratio may adopt any conceivable value. Thus, by way of example, the weight ratio of the amorphous mesoporous metal and/or metalloid oxide to the zeolitic material containing a metal as non-framework element in the inventive catalyst may be comprised in the range of anywhere from 0.001 to 1, wherein preferably the weight ratio of the amorphous mesoporous metal and/or metalloid oxide to the zeolitic material containing a metal as non-framework element is in the range of from 0.01 to 0.75, more preferably in the range of from 0.025 to 0.5, more preferably in the range of from 0.05 to 0.35, more preferably in the range of from 0.075 to 0.25, more preferably in the range of from 0.1 to 0.2, and more preferably in the range of from 0.12 to 0.16. According to the present invention it is particularly preferred that the weight ratio of the amorphous mesoporous metal and/or metalloid oxide to the zeolitic material containing a metal as non-framework element in the inventive catalyst is comprised in the range of from 0.13 to 0.14. It is, however, alternatively preferred according to the present invention that the weight ratio of the amorphous mesoporous metal and/or metalloid oxide to the zeolitic material containing a metal as non-framework element is in the range of from 0.001 to 0.5, preferably in the range of from 0.005 to 0.2, more preferably in the range of from 0.01 to 0.1, more preferably in the range of from 0.015 to 0.08, more preferably in the range of from 0.02 to 0.05, and more preferably in the range of from 0.023 to 0.04. According to the present invention it is alternatively particularly preferred that the weight ratio of the amorphous mesoporous metal and/or metalloid oxide to the zeolitic material containing a metal as non-framework element in the inventive catalyst is comprised in the range of from 0.025 to 0.035.

Furthermore, it is alternatively preferred according to the present invention that the inventive catalyst does not additionally comprise a support substrate but is rather formed as a shaped body of the composite material contained in the inventive catalyst. As regards the shape which the inventive catalyst may assume according to said alternatively preferred embodiments, no particular restrictions apply such that the composite material of the inventive catalyst may adopt any conceivable shape. It is, however, preferred according to the present invention that the composite material which is formed as a shaped body in the inventive catalyst is obtained by extrusion of the composite material or a precursor thereof, such that it is particularly preferred that the composite material is an extrudate.

Concerning the amorphous mesoporous metal and/or metalloid oxide contained in the inventive catalyst, no particular restrictions apply according to the present invention such that in principle any conceivable amorphous mesoporous metal and/or metalloid oxide may be contained in said mixture. Accordingly, the metal and/or metalloid element of the metal and/or metalloid oxide containing the inventive catalyst may be any suitable metal and/or metalloid element provided that it may form an amorphous mesoporous metal and/or metalloid oxide. Thus, in principle, the metal and/or metalloid may be any suitable metal and/or metalloid element. It is, however, preferred according to the present invention that the metal or the metalloid is selected groups 2-5, groups 7-9, and groups 11-14 of the Periodic Table of the Elements, and preferably from groups 2-4, group 13, and group 14. It is, however, preferred according to the present invention that the inventive catalyst contains an amorphous mesoporous metal oxide, wherein more preferably the metal ion is an ion of a metal selected from the group consisting of Mg, Al, Ga, In, Ti, Zr, Hf, Cu, Zn, Fe, Mn, V, Co and combinations of two or more thereof, wherein preferably, the metal ion is an ion of a metal selected from the group consisting of Al, Ga, In, Ti, Zr, Hf, and combinations of two or more thereof, and preferably selected from the group consisting of Al, Ga, Ti, Zr, and combinations of two or more thereof. According to the present invention it is however particularly preferred that the preferred amorphous mesoporous metal oxide contained in the inventive catalyst is an amorphous mesoporous oxide of Al and/or Zr, and preferably of Al.

With respect to the metal contained in the zeolitic material of the inventive catalyst as a non-framework element, any suitable metal may be employed to this effect, provided that it may be contained in the microporous channels of the zeolitic material. Thus, by way of example, the metal contained in the zeolitic material as non-framework element may be selected from the group consisting of the elements of groups 3 to 12 of the Periodic Table of the Elements, and combinations of two or more thereof, wherein the metal contained in the zeolitic material as non-framework element is preferably selected from the group consisting of Pt, Pd, Rh, Ir, Ru, Cu, Co, Cr, Mn, Ni, Fe, V, Nb, and combinations of two or more thereof, and more preferably selected from the group consisting of Cu, Co, Cr, Ni, Fe, and combinations of two or more thereof. According to the present invention it is particularly preferred that the metal contained in the zeolitic material as non-framework element comprises Cu and/or Fe, and preferably Cu, wherein more preferably the zeolitic material contains Cu and/or Fe, preferably Cu as non-framework element.

As regards the amount of the metal comprised as non-framework element in the zeolitic material contained in the composite material of the inventive catalyst, any suitable amount may be contained therein. Thus, by way of example, the total amount of the metal contained in the zeolitic material as a non-framework element may be in the range of from 0.1 to 15 wt.-% calculated as the metal element and based on 100 wt.-% of the calcined zeolitic material, wherein according to the inventive process the total amount of the metal contained in the zeolitic material as non-framework element is preferably in the range of from 0.3 to 12 wt.-%, more preferably from 0.5 to 10 wt.-%, more preferably from 0.8 to 8 wt.-%, more preferably from 1 to 6 wt.-%, more preferably from 1.3 to 5 wt.-%, more preferably from 1.5 to 4.5 wt.-%, more preferably from 1.8 to 4 wt.-%, more preferably from 2 to 3.5 wt.-%, more preferably from 2.3 to 3.3 wt.-%. According to the inventive process it is particularly preferred that the total amount of the metal contained in the zeolitic material as a non-framework element is in the range of from 2.5 to 3 wt.-%.

Concerning the zeolitic material as such which is contained in the inventive catalyst, no restrictions apply according to the present invention such that any conceivable zeolitic material may be contained therein. According to the present invention it is however preferred that the framework of the zeolitic material comprises $YO_2$, and preferably that the framework of the zeolitic material comprises $YO_2$ and $X_2O_3$, wherein Y is a tetravalent element and X is a trivalent element. Thus, by way of example, Y may be selected from the group consisting of Si, Sn, Ti, Zr, Ge, and combinations of two or more thereof, wherein Y preferably comprises Si and/or Ge, and more preferably comprises Si. According to the present invention it is particularly preferred that Y is Si and/or Ge, wherein Y is preferably Si. Same applies accordingly with respect to the trivalent element X preferably comprised as $X_2O_3$ in the framework of the zeolitic material. Thus, by way of example, X may be selected from the group consisting of Al, B, In, Ga, and combinations of two or more thereof, wherein X preferably comprises Al and/or Ga, and more preferably comprises Al. According to the present invention it is however particularly preferred that X is Al and/or Ge, wherein more preferably X is Al.

Regarding the particular and preferred embodiments of the present invention wherein the framework of the zeolitic material contained in the composite material of the inventive catalyst comprises both $YO_2$ and $X_2O_3$, no particular restrictions apply relative to the molar ratio in which $YO_2$ and $X_2O_3$ may be contained therein. Thus, by way of example, the zeolitic material may comprise $YO_2$ and $X_2O_3$, wherein the molar ratio of $YO_2:X_2O_3$ is in the range of from 5 to 100, wherein preferably the molar ratio of $YO_2:X_2O_3$ is in the range of from 10 to 50, more preferably from 20 to 35, and more preferably from 22 to 30. According to the present invention it is partitularly preferred that in instances wherein the framework of the zeolitic material contained in the composite material of the inventive catalyst comprises $YO_2$ and $X_2O_3$, the molar ratio of $YO_2:X_2O_3$ is in the range of from 23 to 27.

Furthermore, as regards the framework structure of the zeolitic material contained in the composite material of the inventive catalyst, again no particular restrictions apply such that the zeolitic material may have any type of framework structure. Thus, by way of example, the zeolitic material contained in the composite material of the inventive catalyst may have a framework structure of the type CAN, AEI, EMT, SAV, SZR, KFI, ERI, OFF, RTH, GME, AFX, SFW, BEA, CHA, FAU, FER, HEU, LEV, MEI, MEL, MFI, or MOR, wherein preferably the zeolitic material contained in the composite material of the inventive catalyst has a framework structure of the type AEI, GME, BEA, CHA, FAU, FER, HEU, LEV, MEI, MEL, MFI, or MOR, more preferably of the type AEI, GME, CHA, MFI, BEA, FAU, or MOR, and more preferably of the type CHA, AEI, or BEA. According to the present invention it is, however, particularly preferred that the zeolitic material contained in the composite material of the inventive catalyst has a framework structure of the type CHA and/or AEI, wherein more preferably the zeolitic material has the CHA framework structure.

According to the present invention it is preferred that the inventive catalyst is contained in a system for the treatment of a gas containing NOx, and preferably in a system for the treatment of an exhaust gas containing NOx. According to said preferred embodiments of the present invention wherein the inventive catalyst is comprised in an exhaust gas treatment system, it is further preferred that said treatment system comprises an internal combustion engine and an exhaust gas conduit in fluid communication with the internal combustion engine, wherein the catalyst is present in the exhaust gas conduit. As regards the exhaust gas treatment system in which the inventive catalyst is preferably contained, no particular restrictions apply relative to the type of internal combustion engine contained therein, provided that its exhaust gas contains NOx. It is, however, preferred according to the present invention that the internal combustion engine is a lean burn engine, and more preferably a diesel engine.

Furthermore, the present invention also relates to the exhaust gas treatment system per se comprising an internal combustion engine and an exhaust gas conduit in fluid communication with the internal combustion engine, wherein the inventive catalyst according to any of the particular and preferred embodiments defined in the present application is present in the exhaust gas conduit, the internal combustion engine being preferably a lean burn engine, and more preferably a diesel engine. As regards the exhaust gas treatment system of the present invention, no particular restrictions apply as to any further components which may be comprised therein. Thus, by way of example, the inventive exhaust gas treatment system may further comprise an oxidation catalyst, a lean $NO_x$ storage catalyst, and/or a catalyzed soot filter. According to said preferred embodiments of the inventive exhaust gas treatment system further comprising an oxidation catalyst, a lean $NO_x$ storage catalyst, and/or a catalyzed soot filter, said one or more further components of the exhaust gas treatment system may in principle be located at any point of the exhaust gas conduit and may in particular be, independently from one another, be located upstream or downstream of the catalyst according to any of the particular and preferred embodiments as defined in the present application. It is, however, preferred that the oxidation catalyst, the lean $NO_x$ storage catalyst, and/or the catalyzed soot filter are located upstream of the inventive catalyst according to any of the particular and preferred embodiments as defined in the present application. According to particular and preferred embodiments of the inventive exhaust gas treatment system wherein the internal combustion engine is a diesel engine, and wherein the system further comprises an oxidation catalyst, it is preferred in said instances that the oxidation catalyst is a diesel oxidation catalyst.

In addition to relating to a method for the preparation of a catalyst and to a catalyst as such, the present invention further relates to a process for the selective catalytic reduction of NOx comprising (1) providing a gas stream comprising $NO_x$;
(2) contacting the gas stream provided in (1) with a catalyst according to any of the particular and preferred embodiments of the inventive catalyst as defined in the present application.

According to the inventive method, it is preferred that the gas stream treated by contacting with the inventive catalyst comprises one or more reducing agents for selective catalytic reduction of NOx. To this effect, any suitable reducing agent or combination of reducing agents may be employed, provided that they may reduce NOx to nitrogen gas under the catalytic conditions provided by the inventive method. According to the inventive method it is however preferred that urea and/or ammonia is comprised among the reducing agents used, wherein more preferably urea and/or ammonia is employed as the reducing agent in the inventive method, preferably ammonia.

Therefore, it is preferred according inventive method that the gas stream further comprises one or more reducing agents, the one or more reducing agents preferably comprising urea and/or ammonia, preferably ammonia.

As regards the gas comprising NOx, there is no particular restriction according to the present invention as to how said gas stream is provided, such that it may stem from any conceivable source. It is, however, preferred according to the present invention that the gas stream comprises a $NO_x$ containing waste gas stream from an internal combustion engine, preferably from an internal combustion engine which operates under lean-burn conditions, and more preferably from a lean-burn gasoline engine or from a diesel engine.

According to the present invention it is alternatively preferred that the gas stream comprises one or more NOx containing waste gases from one or more industrial processes, wherein more preferably the NOx containing waste gas stream comprises one or more waste gas streams obtained in processes for producing adipic acid, nitric acid, hydroxylamine derivatives, caprolactame, glyoxal, methylglyoxal, glyoxylic acid or in processes for burning nitrogenous materials, including mixtures of waste gas streams from two or more of said processes.

Finally, the present invention also relates to the use of the inventive catalyst for the selective catalytic reduction of NOx, in particular in the field of catalysis and/or in the treatment of exhaust gas, wherein said exhaust gas treatment comprises industrial and automotive exhaust gas treatment. It is, however, preferred according to the present invention that the inventive catalyst according to any of the particular and preferred embodiments defined in the present application is used as a catalyst for the selective catalytic reduction of NOx, and preferably in the treatment of NOx containing exhaust gas by SCR, wherein more preferably the inventive catalyst is used in the treatment of industrial or automotive exhaust gas. According to the present invention it is particularly preferred that the inventive catalyst according to any of the particular and preferred embodiments defined in the present application is used in the treatment of automotive exhaust gas.

The present invention is further characterized by the following and particular preferred embodiments, including the combination and embodiments indicated by the respective dependencies:

1. A process for the preparation of a catalyst comprising
    (i) preparing a mixture comprising a metal-organic framework material comprising an ion of a metal or metalloid selected from groups 2-5, groups 7-9, and groups 11-14 of the Periodic Table of the Elements, preferably from groups 2-4, group 13, and group 14, and at least one at least monodentate organic compound,
    a zeolitic material containing a metal as a non-framework element,
    a solvent system,
    and optionally a pasting agent;
    (i.A) homogenizing the mixture obtained in (i), wherein the mixture comprises a solvent system;
    (i.B) providing a support substrate;
    (i.C) coating the support substrate provided in (i.B) with the homogenized mixture obtained in (i.A);
    (i.D) optionally drying the coated support substrate obtained in (i.C);
    (i.E) calcining of the coated support substrate obtained in (i.C) or (i.D),
    wherein preferably the metal-organic framework material comprises at least one at least bidentate organic compound.
2. The process according to embodiment 1, wherein the optional drying in (i.D) is effected at a temperature in the range from 50 to 220° C., preferably from 70 to 180° C., more preferably from 80 to 150° C., more preferably from 90 to 130° C., more preferably from 100 to 125° C., and more preferably from 110 to 120° C.
3. The process according to embodiment 1 or 2, wherein the calcining in (ii) is effected at a temperature in the range from 300 to 750° C., more preferably from 325 to 650° C., more preferably from 350 to 600° C., more preferably from 375 to 550° C., more preferably from 400 to 500° C., and more preferably from 425 to 475° C.
4. The process according to any of embodiments 1 to 3, wherein the solvent system comprises one or more solvents selected from the group consisting of alcohols, water, mixtures of two or more alcohols, and mixtures of water and one or more alcohols,
    preferably from the group consisting of $(C_1-C_6)$-alcohols, water, mixtures of two or more $(C_1-C_6)$-alcohols and mixtures of water and one or more $(C_1-C_6)$-alcohols,
    more preferably from the group consisting of $(C_1-C_4)$-alcohols, water, mixtures of two or more $(C_1-C_4)$-alcohols and mixtures of water and one or more $(C_1-C_4)$-alcohols,
    more preferably from the group consisting of methanol, ethanol, n-propanol, isopropanol, water and mixtures of two or more thereof,
    more preferably from the group consisting of methanol, ethanol, water and mixtures of two or more thereof, wherein more preferably the solvent system comprises water, preferably distilled water, and wherein more preferably the solvent system consists of water, preferably of distilled water.
5. The process according to any of embodiments 1 to 4, wherein the solids concentration of the mixture prepared in (i) is in the range from 15 to 50% by weight based on the total weight of the metal-organic framework material, of the zeolitic material containing a metal as a non-framework element, and of the solvent system, preferably from 20 to 40% by weight, more preferably from 25 to 35% by weight, and more preferably from 28 to 30% by weight.
6. The process according to any of embodiments 1 to 4, wherein the mixture obtained in (i) which is homogenized in (i.A) comprises a pasting agent, and wherein the solids concentration of the mixture prepared in (i) is in the range from 10 to 70% by weight based on the total weight of the metal-organic framework material, of the zeoliitic material containing a metal as a non-framework element, of the pasting agent, and of the solvent system, preferably from 20 to 50% by weight, more preferably from 30 to 40% by weight, and more preferably from 32 to 36% by weight.
7. The process according to any of embodiments 1 to 6, wherein the homogenizing in (i.A) is effected by stirring, kneading, agitating, vibrating or combinations of two or more thereof, preferably by stirring and/or agitating, and more preferably by stirring.
8. The process according to any of embodiments 1 to 7, wherein the coating in (i.C) is effected by spray coating and/or wash coating, preferably by wash coating.
9. The process according to any of embodiments 1 to 8, wherein (i.C) is repeated once or more than once, preferably once to five times, more preferably once to four times, more preferably once to three times, more preferably once or twice, and more preferably once.
10. The process according to any of embodiments 1 to 9, wherein the support substrate is selected from the group consisting of granules, pellets, meshes, rings, spheres, cylinders, hollow cylinders, monoliths and mixtures and combinations of two or more thereof, wherein preferably the support substrate is a monolith, more preferably a honeycomb monolith, wherein the honeycomb monolith is preferably a wall-flow or flow-through monolith, preferably a wall-flow monolith.
11. The process according to any of embodiments 1 to 10, wherein the support substrate comprises ceramic and/or metallic substances, preferably ceramic substances, more preferably one or more ceramic substances selected from the group consisting of alumina, silica, silicates, aluminosilicates, aluminotitanates, silicon carbide, cordierite, mullite, zirconium, spinels, magnesia, titania and mixtures of two or more thereof, more preferably from the group consisting of α-alumina, aluminotitanates, silicon carbide, cordierite and mixtures of two or more thereof, more preferably from the group consisting of $Al_2TiO_5$, SiC, cordierite and mixtures of two or more thereof, wherein more preferably the support substrate comprises SiC, wherein more preferably the support substrate consists of SiC.
12. The process according to any of embodiments 1 to 11, wherein the loading of the zeolitic material containing a metal as non-framework element on the support substrate is in the range from 0.01 to 15 $g/in^3$ based on the total volume of the uncoated support substrate, preferably from 0.05 to 10 $g/in^3$, more preferably from 0.1 to 5 g/in³, more preferably from 0.2 to 4 g/in³, more preferably from 0.4 to 3.5 g/in³, more preferably from 0.6 to 3 g/in³, more preferably from 0.8 to 2.5 g/in³, more preferably from 1 to 2 g/in³, more preferably from 1.2 to 1.8 g/in³, and more preferably from 1.4 to 1.6 g/in³.

13. A process for the preparation of a catalyst comprising
    (i) preparing a mixture comprising a metal-organic framework material comprising an ion of a metal or metalloid selected from groups 2-5, groups 7-9, and groups 11-14 of the Periodic Table of the Elements, preferably from groups 2-4, group 13, and group 14, and
    at least one at least monodentate organic compound,
    a zeolitic material containing a metal as a non-framework element,
    optionally a solvent system,
    and optionally a pasting agent,
    (ii) calcining of the mixture obtained in (i),
    wherein preferably the metal-organic framework material comprises at least one at least bidentate organic compound.

14. The process according to embodiment 13, the process further comprising (i.a) homogenizing and shaping of the mixture obtained in (i) prior to calcination thereof in (ii).

15. The process according to embodiment 14, wherein the shaping of the mixture obtained in step (i.a) is effected by extrusion.

16. The process according to any of embodiments 14 to 15, the process further comprising (i.b) drying of the mixture obtained in (i) or (i.a).

17. The process according to any of embodiments 14 to 16, wherein (i) is effected by kneading.

18. The process according to any of embodiments 14 to 17, wherein the drying of (i.b) is effected at a temperature in the range of from 80 to 160° C., preferably of from 100 to 140° C., more preferably of from 110 to 130° C.

19. The process according to any of embodiments 14 to 18, wherein the drying of (i.b) is effected for a time in the range of from 1 to 7 hours, preferably of from 4 to 6 hours, more preferably of from 4.5 to 5.5 hours.

20. The process according to any of embodiments 14 to 19, wherein the calcining in (ii) is effected at a temperature in the range of from 250 to 700° C., preferably 400 to 640° C., more preferably of from 450 to 590° C., more preferably of from 520 to 560° C.

21. The process according to any of embodiments 14 to 20, wherein the calcining in (ii) is effected for a time in the range of from 3 to 7 h, preferably of from 4 to 6 h, more preferably of from 4.5 to 5.5 h.

22. The process according to any of embodiments 14 to 21, wherein the mixture comprises a solvent system, and wherein the solids concentration of the mixture prepared in (i) is in the range of from 25 to 75% by weight based on the total weight of the metal-organic framework material, of the zeoliitic material containing a metal as a non-framework element, and of the solvent system, preferably 30 to 70% by weight, more preferably 35 to 65% by weight, more preferably 40 to 60% by weight, and more preferably 45 to 55% by weight.

23. The process according to any of embodiments 1 to 22, wherein the ion comprised in the metal-organic framework material is an ion of a metal selected from the group consisting of Mg, Al, Ga, In, Ti, Zr, Hf, Cu, Zn, Fe, Mn, V, Co and combinations of two or more thereof, preferably selected from the group consisting of Al, Ga, In, Ti, Zr, Hf, and combinations of two or more thereof, preferably selected from the group consisting of Al, Ga, Ti, Zr, and combinations of two or more thereof, wherein more preferably the metal is Al and/or Zr, preferably Al.

24. The process according to any of embodiments 1 to 23, wherein the at least monodentate organic compound is a monodentate organic compound, a bidentate organic compound, a tridentate organic compound, a tetradentate organic compound, or a mixture of two or more thereof,
    wherein the at least monodentate organic compound is preferably selected from the group consisting of respectively optionally at least partially deprotonated imidazoles, dicarboxylic acids, tricarboxylic acids, tetracarboxylic acids, and mixtures of two or more thereof,
    wherein the at least monodentate organic compound is more preferably selected from the group consisting of respectively optionally at least partially deprotonated imidazole, acetylenedicarboxylic acid, camphordicarboxylic acid, fumaric acid, succinic acid, benzenedicarboxylic acid, naphthalenedicarboxylic acid, biphenyldicarboxylic acid, pyrazinedicarboxylic acid, bipyridinedicarboxylic acid, benzenetricarboxylic acid, benzenetetracarboxylic acid, adamantanetetracarboxylic acid, dihydroxyterephthalic acid, and mixtures of two or more thereof,
    wherein the organic compound is more preferably optionally at least partially deprotonated fumaric acid.

25. The process according to any of embodiments 1 to 24, wherein the metal contained in the zeolitic material as non-framework element is selected from the group consisting of the elements of groups 3 to 12 of the Periodic Table of the Elements, and combinations of two or more thereof, wherein the metal contained in the zeolitic material as non-framework element is preferably selected from the group consisting of Pt, Pd, Rh, Ir, Ru, Cu, Co, Cr, Mn, Ni, Fe, V, Nb, and combinations of two or more thereof, more preferably selected from the group consisting of Cu, Co, Cr, Ni, Fe, and combinations of two or more thereof,
    wherein more preferably the zeolitic material contains Cu and/or Fe, preferably Cu as non-framework element.

26. The process according to embodiment 25, wherein the total amount of the metal contained in the zeolitic material as a non-framework element is in the range from 0.1 to 15 wt.-% calculated as the metal element and based on 100 wt.-% of the calcined zeolitic material, preferably from 0.3 to 12 wt.-%, more preferably from 0.5 to 10 wt.-%, more preferably from 0.8 to 8 wt.-%, more preferably from 1 to 6 wt.-%, more preferably from 1.3 to 5 wt.-%, more preferably from 1.5 to 4.5 wt.-%, more preferably from 1.8 to 4 wt.-%, more preferably from 2 to 3.5 wt.-%, more preferably from 2.3 to 3.3 wt.-%, and more preferably from 2.5 to 3 wt.-%.

27. The process according to any of embodiments 1 to 26, wherein the metal contained in the zeolitic material has been introduced into the zeolitic material by impregnation and/or ion-exchange, preferably by ion-exchange.

28. The process according to any of embodiments 1 to 27, wherein the zeolitic material comprises $YO_2$ and optionally comprises $X_2O_3$, wherein Y is a tetravalent element and X is a trivalent element.
29. The process according to embodiment 28, wherein Y is selected from the group consisting of Si, Sn, Ti, Zr, Ge, and combinations of two or more thereof, wherein Y is preferably Si and/or Ge, more preferably Si.
30. The process according to embodiment 28 or 29, wherein X is selected from the group consisting of Al, B, In, Ga, and combinations of two or more thereof, wherein X is preferably Al and/or Ga, more preferably Al.
31. The process according to any of embodiments 1 to 30, wherein the zeolitic material comprises $YO_2$ and $X_2O_3$, wherein the molar ratio of $YO_2:X_2O_3$ is in the range of from 5 to 100, preferably from 10 to 50, more preferably from 20 to 35, more preferably from 22 to 30, and more preferably from 23 to 27.
32. The process according to any of embodiments 1 to 31, wherein the zeolitic material has a framework structure of the type CAN, AEI, EMT, SAV, SZR, KFI, ERI, OFF, RTH, GME, AFX, SFW, BEA, CHA, FAU, FER, HEU, LEV, MEI, MEL, MFI, or MOR, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type CHA, AEI, or BEA, more preferably of the type CHA and/or AEI, and more preferably CHA.
33. The process according to any of embodiments 1 to 32, wherein the solvent system comprises a polar protic solvent, a polar aprotic solvent, or a mixture thereof, wherein the solvent system preferably comprises a compound selected from the group consisting of water, an alcohol, an acid, a ketone, an aldehyde, an ether, an ester, a phenol, N,N-dimethyl formamide, dimethylsulfoxide, and a mixture of two or more thereof, wherein the solvent system more preferably comprises a compound selected from the group consisting of water, methanol, ethanol, acetic acid, N,N-dimethyl formamide, dimethylsulfoxide, and a mixture of two or more thereof, wherein the solvent system more preferably comprises water or deionized water, wherein the solvent system more preferably is deionized water.
34. The process according to any of embodiments 1 to 33, wherein the weight ratio of the metal-organic framework material calculated as the oxide of the metal or metalloid to the zeolitic material containing a metal as a non-framework element in the mixture of (i) is in the range of from 0.001 to 1, preferably in the range of from 0.01 to 0.75, more preferably in the range of from 0.025 to 0.5, more preferably in the range of from 0.05 to 0.35, more preferably in the range of from 0.075 to 0.25, more preferably in the range of from 0.1 to 0.2, more preferably in the range of from 0.12 to 0.16, and more preferably in the range of from 0.13 to 0.14.
35. The process according to any of embodiments 1 to 33, wherein the weight ratio of the metal-organic framework material calculated as the oxide of the metal or metalloid to the zeolitic material containing a metal as a non-framework element in the mixture of (i) is in the range of from 0.001 to 0.5, preferably in the range of from 0.005 to 0.2, more preferably in the range of from 0.01 to 0.1, more preferably in the range of from 0.015 to 0.08, more preferably in the range of from 0.02 to 0.05, more preferably in the range of from 0.023 to 0.04, and more preferably in the range of from 0.025 to 0.035.
36. The process according to any of embodiments 1 to 35, wherein the pasting agent preferably comprises an organic polymer selected from the group consisting of polyalkyleneoxide, cellulose, starch, wallpaper plaster, polyacrylate, polymethacrylate, polyvinylaclohol, polyvinyl pyrrolidone, polyisobutene, polytetrahydrofuran, and a mixture of two or more thereof, more preferably the pasting agent comprises polyethylene glycol.
37. The process according to embodiment 36, wherein the weight ratio of the metal-organic framework material to the pasting agent is in the range of from 0.1 to 20, preferably of from 1 to 15, more preferably from 1.5 to 14.5, more preferably of from 2 to 12, more preferably of from 2.5 to 10.5, more preferably of from 3 to 9, more preferably of from 3.5 to 8.5, more preferably of from 4 to 8, more preferably of from 4.5 to 7.5, more preferably of from 5 to 7, and more preferably of from 5.5 to 6.5.
38. The process according to embodiment 36 or 37, wherein the weight ratio of the sum of the weights of the metal-organic framework material and the zeolitic material containing a metal as a non-framework element to the pasting agent is in the range of from 30 to 10, preferably of from 25 to 15, more preferably of from 22.5 to 17.5, more preferably of from 20.5 to 19.5.
39. A catalyst obtained and/or obtainable by a process according to any of embodiments 1 to 38.
40. A catalyst comprising a composite material containing an amorphous mesoporous metal and/or metalloid oxide and a zeolitic material, wherein the zeolitic material contains a metal as non-framework element, and wherein the catalyst is preferably obtained and/or obtainable by a process according to any of embodiments 1 to 38.
41. The catalyst according to embodiment 40, wherein the mesoporous metal and/or metalloid oxide displays an average pore size in the range of 3 to 10 nm based on the porosity measured in the range of 2 nm to 50 nm, preferably based on the porosity measured in the range of 3 nm to 50 nm, wherein preferably the metal and/or metalloid oxide displays an average pore size in the range of 3.5 to 8 nm, more preferably from 3.5 to 6 nm, more preferably from 3.5 to 5 nm, more preferably from 3.5 to 4.5 nm, and more preferably from 3.8 to 4.2 nm based on the porosity measured in the range of 2 nm to 50 nm, preferably based on the porosity measured in the range of 3 nm to 50 nm, wherein the average pore size is determined according to ISO 15901-2:2006.
42. The catalyst according to embodiment 40 or 41, wherein the catalyst further comprises a support substrate onto which the composite material is provided, preferably as a coating layer, and more preferably as a washcoat layer.
43. The catalyst according to any of embodiments 40 to 42, wherein the support substrate is selected from the group consisting of granules, pellets, meshes, rings, spheres, cylinders, hollow cylinders, monoliths and mixtures and combinations of two or more thereof, wherein preferably the support substrate is a monolith, more preferably a honeycomb monolith, wherein the honeycomb monolith is preferably a wall-flow or flow-through monolith, preferably a wall-flow monolith.
44. The catalyst according to any of embodiments 40 to 43, wherein the support substrate comprises ceramic and/or metallic substances, preferably ceramic substances, more preferably one or more ceramic substances selected from the group consisting of alumina, silica, silicates, aluminosilicates, aluminotitanates, silicon carbide, cordierite, mullite, zirconium, spinels, magnesia, titania and mixtures of two or more thereof, more preferably from the group consisting of α-alumina, aluminotitanates, silicon carbide, cordierite and mixtures of two or more thereof, more preferably from the group consisting of $Al_2TiO_5$, SiC, cordierite and mixtures of two or more thereof, wherein more preferably the support substrate comprises SiC, wherein more preferably the support substrate consists of SiC.
45. The catalyst according to any of embodiments 40 to 44, wherein the loading of the zeolitic material containing a metal as non-framework element on the support substrate is in the range from 0.01 to 15 $g/in^3$ based on the total volume of the uncoated support substrate, preferably from 0.05 to 10 $g/in^3$, more preferably from 0.1 to 5 $g/in^3$, more preferably from 0.2 to 4 $g/in^3$, more preferably from 0.4 to 3.5 $g/in^3$, more preferably from 0.6 to 3 $g/in^3$, more preferably from 0.8 to 2.5 $g/in^3$, more preferably from 1 to 2 $g/in^3$, more preferably from 1.2 to 1.8 $g/in^3$, and more preferably from 1.4 to 1.6 $g/in_3$.
46. The catalyst according to any of embodiments 40 to 45, wherein the weight ratio of the amorphous mesoporous metal and/or metalloid oxide to the zeolitic material containing a metal as non-framework element is in the range of from 0.001 to 1, preferably in the range of from 0.01 to 0.75, more preferably in the range of from 0.025 to 0.5, more preferably in the range of from 0.05 to 0.35, more preferably in the range of from 0.075 to 0.25, more preferably in the range of from 0.1 to 0.2, more preferably in the range of from 0.12 to 0.16, and more preferably in the range of from 0.13 to 0.14.
47. The catalyst according to any of embodiments 40 to 45, wherein the weight ratio of the amorphous mesoporous metal and/or metalloid oxide to the zeolitic material containing a metal as non-framework element is in the range of from 0.001 to 0.5, preferably in the range of from 0.005 to 0.2, more preferably in the range of from 0.01 to 0.1, more preferably in the range of from 0.015 to 0.08, more preferably in the range of from 0.02 to 0.05, more preferably in the range of from 0.023 to 0.04, and more preferably in the range of from 0.025 to 0.035.
48. The catalyst according to any of embodiments 40 to 47, wherein the composite material is a shaped body, preferably an extrudate.
49. The catalyst according to any of embodiments 40 to 48, wherein the metal and/or metalloid of the amorphous mesoporous metal and/or metalloid oxide is selected from the group consisting of Mg, Al, Ga, In, Ti, Zr, Hf, Cu, Zn, Fe, Mn, V, Co and combinations of two or more thereof, preferably selected from the group consisting of Al, Ga, In, Ti, Zr, Hf, and combinations of two or more thereof, preferably selected from the group consisting of Al, Ga, Ti, Zr, and combinations of two or more thereof, wherein more preferably the metal is Al and/or Zr, preferably Al.
50. The catalyst according to any of embodiments 40 to 49, wherein the metal contained in the zeolitic material as non-framework element is selected from the group consisting of the elements of groups 3 to 12 of the Periodic Table of the Elements, and combinations of two or more thereof, wherein the metal contained in the zeolitic material as non-framework element is preferably selected from the group consisting of Pt, Pd, Rh, Ir, Ru, Cu, Co, Cr, Mn, Ni, Fe, V, Nb, and combinations of two or more thereof, more preferably selected from the group consisting of Cu, Co, Cr, Ni, Fe, and combinations of two or more thereof, wherein more preferably the zeolitic material contains Cu and/or Fe, preferably Cu as non-framework element.
51. The catalyst according to any of embodiments 40 to 50, wherein the total amount of the metal contained in the zeolitic material as a non-framework element is in the range from 0.1 to 15 wt.-% calculated as the metal element based on 100 wt.-% of the calcined zeolitic material, preferably from 0.3 to 12 wt.-%, more preferably from 0.5 to 10 wt.-%, more preferably from 0.8 to 8 wt.-%, more preferably from 1 to 6 wt.-%, more preferably from 1.3 to 5 wt.-%, more preferably from 1.5 to 4.5 wt.-%, more preferably from 1.8 to 4 wt.-%, more preferably from 2 to 3.5 wt.-%, more preferably from 2.3 to 3.3 wt.-%, and more preferably from 2.5 to 3 wt.-%.
52. The catalyst according to embodiment 51, wherein the zeolitic material comprises $YO_2$ and optionally comprises $X_2O_3$, wherein Y is a tetravalent element and X is a trivalent element.
53. The catalyst according to embodiment 51 or 52, wherein Y is selected from the group consisting of Si, Sn, Ti, Zr, Ge, and combinations of two or more thereof, wherein Y is preferably Si and/or Ge, more preferably Si.
54. The catalyst according to any of embodiments 51 to 53, wherein X is selected from the group consisting of Al, B, In, Ga, and combinations of two or more thereof, wherein X is preferably Al and/or Ga, more preferably Al.
55. The catalyst according to any of embodiments 40 to 54, wherein the zeolitic material has a framework structure of the type CAN, AEI, EMT, SAV, SZR, KFI, ERI, OFF, RTH, GME, AFX, SFW, BEA, CHA, FAU, FER, HEU, LEV, MEI, MEL, MFI, or MOR, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type CHA, AEI, or BEA, more preferably of the type CHA and/or AEI, and more preferably CHA.
56. The catalyst according to any of embodiments 39 to 55, wherein the catalyst is comprised in an exhaust gas treatment system comprising an internal combustion engine and an exhaust gas conduit in fluid communication with the internal combustion engine, wherein said catalyst is present in the exhaust gas conduit, and wherein the internal combustion engine is preferably a lean burn engine, and more preferably a diesel engine.
57. An exhaust gas treatment system comprising an internal combustion engine and an exhaust gas conduit in fluid communication with the internal combustion engine, wherein a catalyst according to any of embodiments 39 to 55 is present in the exhaust gas conduit, and wherein the internal combustion engine is preferably a
    lean burn engine, and more preferably a diesel engine.
58. The exhaust gas treatment system of embodiment 57, said exhaust gas treatment system further comprising an oxidation catalyst, a lean $NO_x$ storage catalyst, and/or a catalyzed soot filter, wherein the oxidation catalyst, the lean $NO_x$ storage catalyst, and/or the catalyzed soot filter are preferably located upstream from the catalyst according to any of embodiments 39 to 55, and wherein the oxidation catalyst is a diesel oxidation catalyst in instances where the internal combustion engine is a diesel engine.
59. A method for the selective catalytic reduction of $NO_x$ comprising
   (1) providing a gas stream comprising $NO_x$;
   (2) contacting the gas stream provided in (1) with a catalyst according to any of embodiments 39 to 55.
60. The method of embodiment 59, wherein the gas stream further comprises one or more reducing agents, the one or more reducing agents preferably comprising urea and/or ammonia, preferably ammonia.
61. The method of embodiment 59 or 60, wherein the gas stream comprises one or more $NO_x$ containing waste gases, preferably one or more $NO_x$ containing waste gases from one or more industrial processes, wherein more preferably the NOcontaining waste gas stream comprises one or more waste gas streams obtained in processes for producing adipic acid, nitric acid, hydroxylamine derivatives, caprolactame, glyoxal, methylglyoxal, glyoxylic acid or in processes for burning nitrogeneous materials, including mixtures of waste gas streams from two or more of said processes.
62. The method of any of embodiments 59 to 61, wherein the gas stream comprises a $NO_x$ containing waste gas stream from an internal combustion engine, preferably from an internal combustion engine which operates under lean-burn conditions, and more preferably from a lean-burn gasoline engine or from a diesel engine
63. Use of the catalyst according to any of embodiments 39 to 55 in a catalytic process, preferably as a catalyst, more preferably in the selective catalytic reduction of $NO_x$, and preferably in the treatment of $NO_x$ containing exhaust gas by selective catalytic reduction.
64. Use of the catalyst according to any of embodiments 39 to 55 in the treatment of exhaust gases, more preferably in the treatment of industrial or automotive exhaust gas, and more preferably in the treatment of automotive exhaust gas.

DESCRIPTION OF THE FIGURES

The X-ray diffraction (XRD) patterns shown in the Figures were respectively measured using Cu K alpha-1 radiation. In the respective diffractograms, the diffraction angle 2 theta in ° is shown along the abscissa and the intensities are plotted along the ordinate.

EXAMPLES

Reference Example 1

Preparation of Al-Fumarate Metal Organic Framework (MOF) Powder

Al-fumarate MOF powder was prepared as described in Example 6 of US 2012/0082864 A1. The resulting powder was then calcined by heating thereof in air (200 Nl/h) in 7 h (1° C./min) to 540° C. and holding the powder at that temperature for 5 h.

Figure 1A:
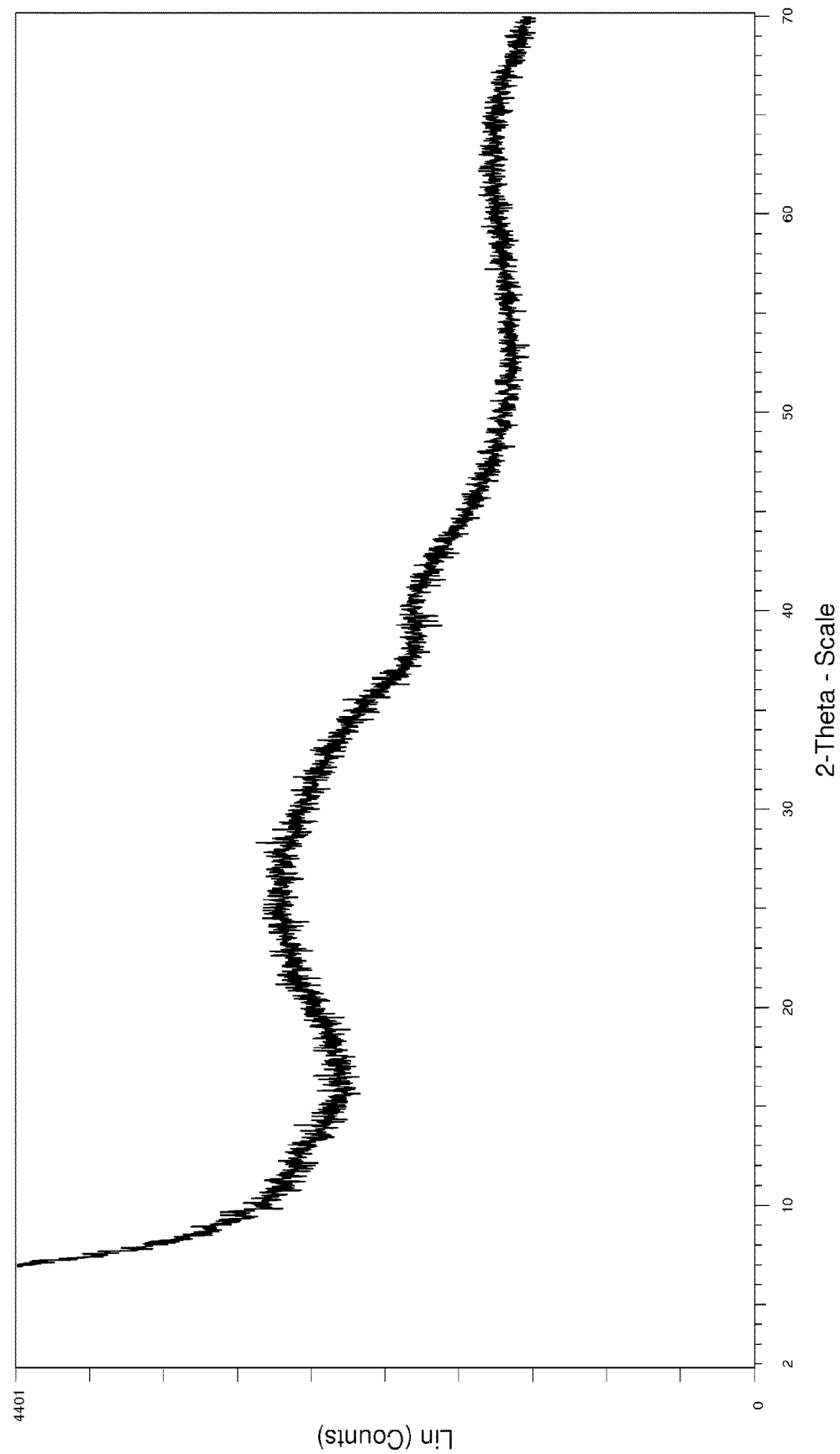
FIG. 1a shows the X-ray diffraction pattern of the amorphous mesoporous aluminum oxide obtained from Reference Example 1.

As may be taken from the X-ray diffraction pattern of the resulting powder shown in FIG. 1a, the material is completely amorphous.

Figure 1B:
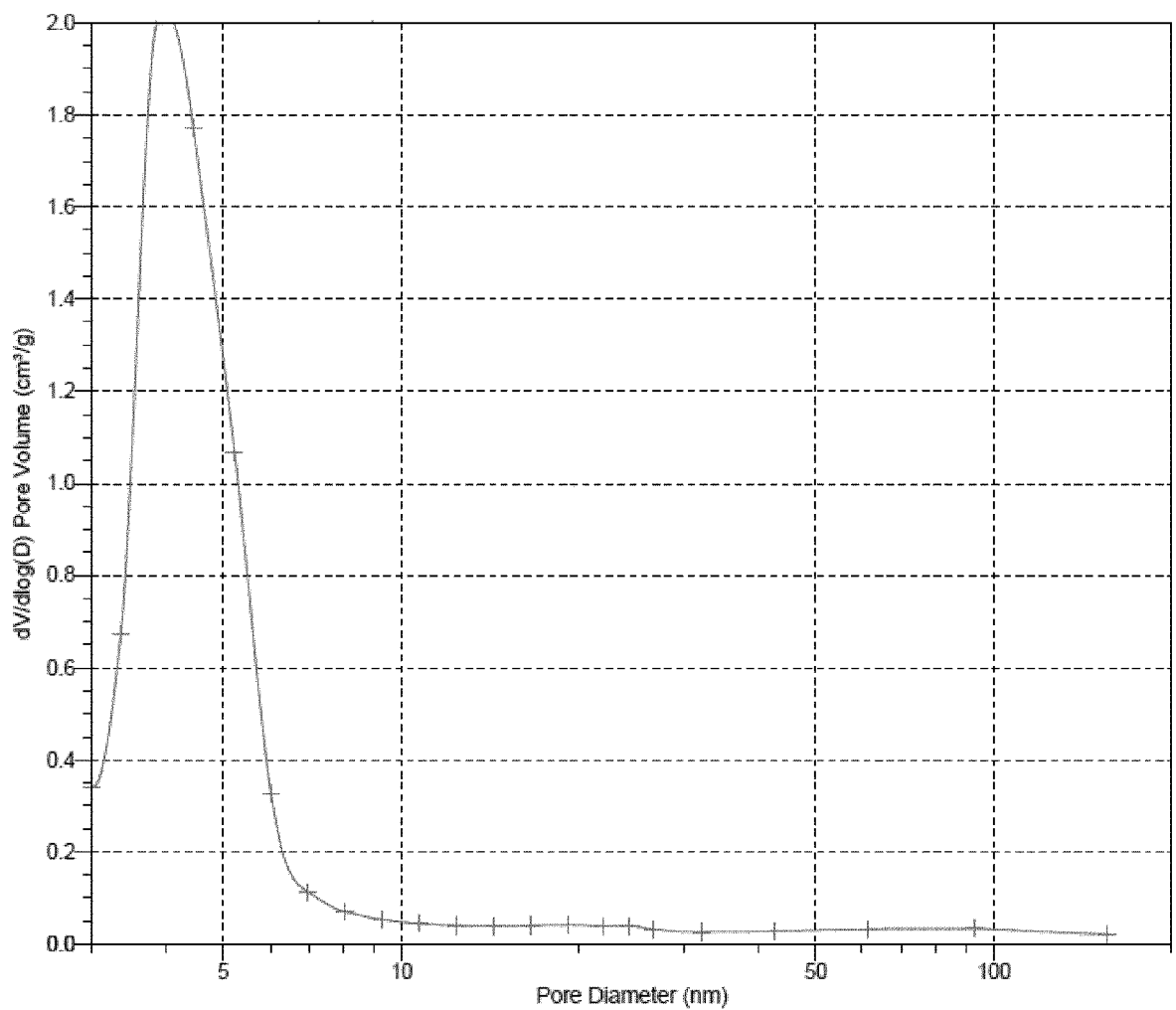
FIG. 1b shows the results from nitrogen sorption analysis at 77K (BJH analysis) of the amorphous mesoporous aluminum oxide obtained from Reference Example 1 wherein the pore diameter in nm is depicted in a logarithmic manner along the abscissa and the pore volume in $cm^3/g$ is plotted along the ordinate.

Results from nitrogen sorption analysis at 77K (BJH analysis) are displayed in FIG. 1b and show a well defined mesoporosity with an average pore size of around 4 nm in the range of from 3 to 50 nm. The material displays a BET surface area of 376 $m^2/g$.

Reference Example 2

Preparation of Copper Chabazite 515.8 g (20.17 wt.-% in $H_2O$; 0.49 moles) of adamantyltrimethylammonium hydroxide were dissolved in 196.5 g (10.92 moles) of distilled water, to which 224.3 g of an aqueous solution of tetramethylammonium hydroxide (25 wt.-% in $H_2O$; 0.62 moles) were added. 93.5 g (0.46 moles) of aluminum triisopropylate were added thereto under stirring at ambient temperature. 19.0 g of chabazite seed crystals (5 wt.-% based on $SiO_2$) were then added to the mixture, which was subsequently stirred for 5 min. Finally 950.8 g of colloidal silica (Ludox AS 40: 40 wt.-% in $H_2O$; 6.34 moles) were added thereto and the mixture then stirred for 20 min. The pH of the resulting mixture was 13.6. The mixture was then placed in a stirred 2.5 L autoclave (430 rpm) and incrementally heated during 8 hours to a temperature of 175° C. at which it was held for 24 h. The resulting solid was filtered of and washed with 10 l distilled water to a conductivity of less than 250 µS/$cm^3$. The powder was then dried over night at 120° C. and subsequently calcined by incremental heating at a rate of 2° C./min to 600° C. and held at that temperature for 6 h to afford 384 g of a white powder.

Elemental analysis of the product afforded <0.1 wt.-% of carbon, 3.0 wt.-% of Al, 0.16 wt.-% of Na, and 40 wt.-% of Si.

The product displayed a BET surface area of 638 $m^2/g$.

Figure 2:
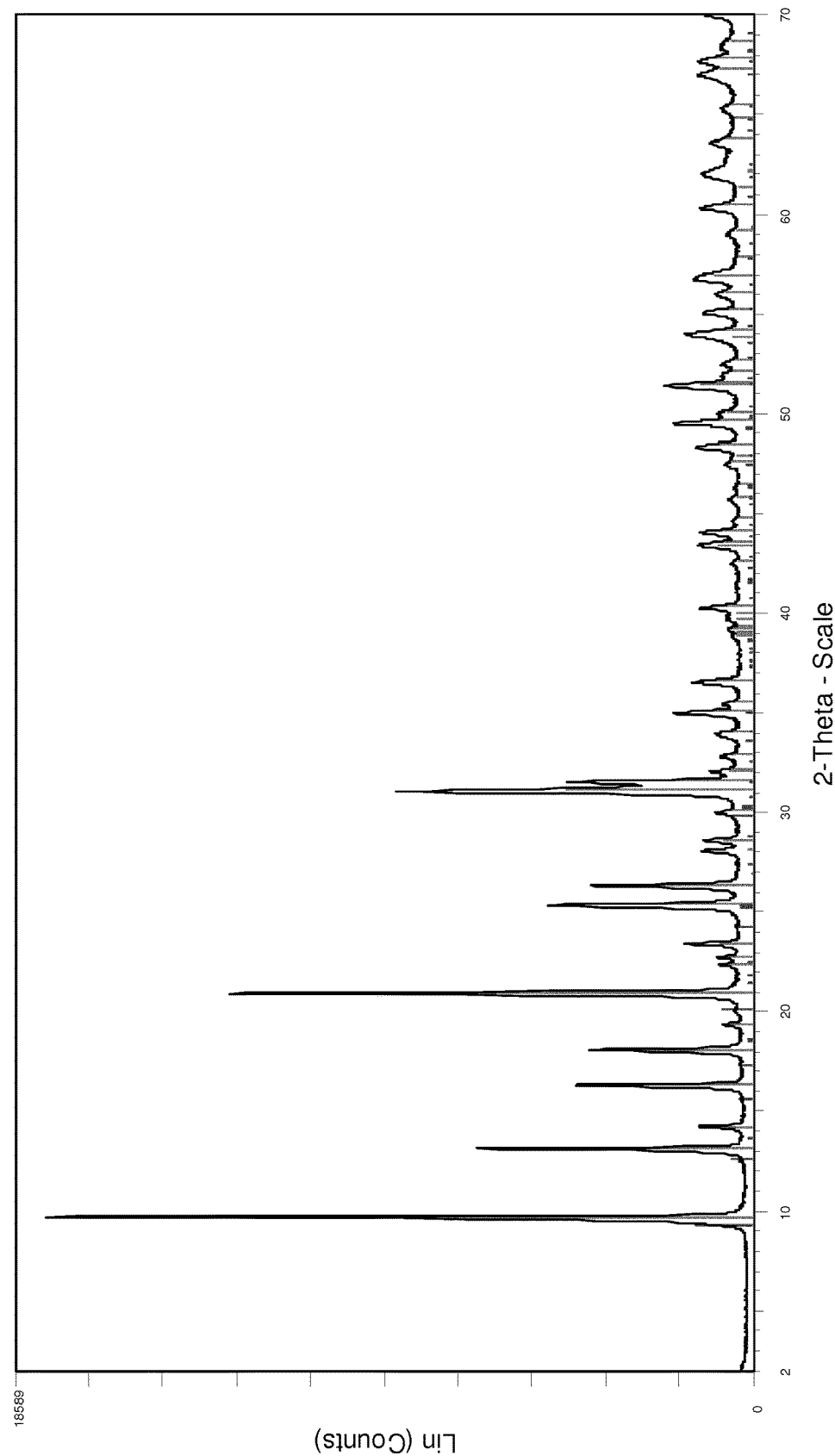
FIG. 2 displays the X-ray diffractogram of the crystalline chabazite product obtained from hydrothermal synthesis after calcination in the Reference Example 2, wherein the line patter of the CHA-type framework structure has been included in the diffractogram as a reference.

The X-ray diffraction patter of the crystalline product is displayed in FIG. 2 and displays the CHA framework structure, as may be taken from a comparison with the line patter of the CHA-type framework structure included in the diffractogram as a reference.

150 g of the chabazite powder were then subject to ion exchange with copper. To this effect, the chabazite powder was dispersed in a solution of 1.2 g of acetic acid in 975.0 g of distilled water and heated to 60° C. 31.2 g of copper acetate monohydrate were then added under stirring and the mixture heated anew to 60° C. and held at that temperature under stirring (250 rpm) for 3 h. The solid was then filtered off an washed with distilled water to a conductivity of less than 200 µS/cm³, after which it was dried at 120° C. for 16 h to afford 150.0 g of a blue powder.

Elemental analysis of the product afforded 3.0 wt.-% of Al, 2.8 wt.-% of Cu, and 39 wt.-% of Si.

The product displayed a BET surface area of 534 m²/g.

Comparative Example 1

Shaping of Copper Chabazite 30 g of copper chabazite from Reference Example 2 were admixed with 1.5 g of polyethylene oxide (Alkox E-160, Meisei Chemical Works, Ltd.) and 31 g of distilled water and the resulting mixture kneaded and subsequently extruded with approximately 10 bars of pressure to extrudate strings with a diameter of 1.5 mm. The extrudates were then incrementally heated to 120° C. over 1 h and then held at that temperature for 5 h, and subsequently incrementally heated (1° C./min) in 7 h to 540° C. and calcined at that temperature for 5 h under air (200 Nl/h).

After cooling to ambient temperature, the calcinated strings were then split to chips with a length ranging from 0.5 to 1 mm.

The resulting extrudate material displayed an $SiO_2:Al_2O_3$ molar ratio or 25 and a copper loading of 3.8 wt.-% calculated as CuO on calcined basis. Furthermore, the total intrusion volume was determined to be 0.91 ml/g and the total pore area 5.5 m²/g as respectively obtained from Hg-porosimetrie. The extrudate material displayed a BET surface area of 552 m²/g and a bulk density of 0.421 g/ml.

Example 1

Shaping of Copper Chabazite with 15 wt% Al-Fumarate MOF 25.5 g of copper chabazite from Reference Example 2 were admixed with 1.5 g of polyethylene oxide (Alkox E-160, Meisei Chemical Works, Ltd.), 4.5 g of Al-fumarate MOF powder from Reference Example 1, and 30 g of distilled water and the resulting mixture kneaded and subsequently extruded with approximately 10 bars of pressure to extrudate strings with a diameter of 1.5 mm. The extrudates were then incrementally heated to 120° C. over 1 h and then held at that temperature for 5 h, and subsequently incrementally heated (1° C./min) in 7 h to 540° C. and calcined at that temperature for 5 h under air (200 Nl/h).

After cooling to ambient temperature, the calcinated strings were then split to chips with a length ranging from 0.5 to 1 mm.

The resulting extrudate material displayed an $SiO_2:Al_2O_3$ molar ratio or 13 and a copper loading of 3.3 wt.-% calculated as CuO on calcined basis. Furthermore, the total intrusion volume was determined to be 1.17 ml/g and the total pore area 11 m²/g as respectively obtained from Hg-porosimetrie. The extrudate material displayed a BET surface area of 532 m²/g and a bulk density of 0.378 g/ml.

Example 2

Shaping of Copper Chabazite with 30 wt % Al-Fumarate MOF 21 g of copper chabazite from Reference Example 2 were admixed with 1.5 g of polyethylene oxide (Alkox E-160, Meisei Chemical Works, Ltd.), 9 g of Al-fumarate MOF powder from Reference Example 1, and 32 g of distilled water and the resulting mixture kneaded and subsequently extruded with approximately 10 bars of pressure to extrudate strings with a diameter of 1.5 mm. The extrudates were then incrementally heated to 120° C. over 1 h and then held at that temperature for 5 h, and subsequently incrementally heated (1° C./min) in 7 h to 540° C. and calcined at that temperature for 5 h under air (200 Nl/h).

After cooling to ambient temperature, the calcinated strings were then split to chips with a length ranging from 0.5 to 1 mm.

The resulting extrudate material displayed an $SiO_2:Al_2O_3$ molar ratio or 7 and a copper loading of 3.0 wt.-% calculated as CuO on calcined basis. Furthermore, the total intrusion volume was determined to be 1.13 ml/g and the total pore area 22 m²/g as respectively obtained from Hg-porosimetrie. The extrudate material displayed a BET surface area of 497 m²/g and a bulk density of 0.375 g/ml.

Example 3

Shaping of Copper Chabazite with 50 wt % Al-Fumarate MOF 13 g of copper chabazite from Reference Example 2 were admixed with 1.3 g of polyethylene oxide (Alkox E-160, Meisei Chemical Works, Ltd.), 13 g of Al-fumarate MOF powder from Reference Example 1, and 27 g of distilled water and the resulting mixture kneaded and subsequently extruded with approximately 10 bars of pressure to extrudate strings with a diameter of 1.5 mm. The extrudates were then incrementally heated to 120° C. over 1 h and then held at that temperature for 5 h, and subsequently incrementally heated (1° C./min) in 7 h to 540° C. and calcined at that temperature for 5 h under air (200 Nl/h).

After cooling to ambient temperature, the calcinated strings were then split to chips with a length ranging from 0.5 to 1 mm.

The resulting extrudate material displayed an $SiO_2:Al_2O_3$ molar ratio or 4 and a copper loading of 2.8 wt.-% calculated as CuO on calcined basis. Furthermore, the total intrusion volume was determined to be 1.35 ml/g and the total pore area 39 m²/g as respectively obtained from Hg-porosimetrie. The extrudate material displayed a BET surface area of 470 m²/g and a bulk density of 0.331 g/ml.

Comparative Example 2

Shaping of Copper Chabazite Synthesized According to WO 2015/185625 A2

30 g of copper chabazite as obtained according to Example 3 of WO 2015/185625 A1 was admixed with 1.5 g of polyethylene oxide (Alkox E-160, Meisei Chemical Works, Ltd.) and 29 g of distilled water and the resulting mixture kneaded and subsequently extruded with approximately 10 bars of pressure to extrudate strings with a diameter of 1.5 mm. The extrudates were then incrementally heated to 120° C. over 1 h and then held at that temperature for 5 h, and subsequently incrementally heated (1° C./min) in 7 h to 540° C. and calcined at that temperature for 5 h under air (200 Nl/h).

After cooling to ambient temperature, the calcinated strings were then split to chips with a length ranging from 0.5 to 1 mm.

The resulting extrudate material displayed an $SiO_2:Al_2O_3$ molar ratio or 24 and a copper loading of 3.1 wt.-% calculated as CuO on calcined basis. Furthermore, the total intrusion volume was determined to be 0.73 ml/g and the total pore area 12 $m^2/g$ as respectively obtained from Hg-porosimetrie. The extrudate material displayed a BET surface area of 586 $m^2/g$ and a bulk density of 0.450 g/ml.

Reference Example 3

Preparation of Zr-Fumarate Metal Organic Framework (MOF) Powder

Zr-fumarate MOF was obtained according to the procedure described in WO 2015/127033 A, paragraph [00208] (MOF-801-P).

Example 4

Shaping of Copper Chabazite Synthesized According to WO 2015/185625 A2 with 30 wt % Zr-Fumarate MOF 21 g of copper chabazite as obtained according to Example 3 of WO 2015/185625 A1 was admixed with 1.5 g of polyethylene oxide (Alkox E-160, Meisei Chemical Works, Ltd.), 9 g of Zr-fumarate MOF obtained according to Reference Example 3, and 22 g of distilled water and the resulting mixture kneaded and subsequently extruded with approximately 10 bars of pressure to extrudate strings with a diameter of 1.5 mm. The extrudates were then incrementally heated to 120° C. over 1 h and then held at that temperature for 5 h, and subsequently incrementally heated (1° C./min) in 7 h to 540° C. and calcined at that temperature for 5 h under air (200 Nl/h).

After cooling to ambient temperature, the calcinated strings were then split to chips with a length ranging from 0.5 to 1 mm.

The resulting extrudate material displayed an $SiO_2:Al_2O_3$ molar ratio or 24, a copper loading of 2.6 wt.-% calculated as CuO on calcined basis, and a content of 20 wt.-% $ZrO_2$ on calcined basis. Furthermore, the total intrusion volume was determined to be 0.82 ml/g and the total pore area 15 $m^2/g$ as respectively obtained from Hg-porosimetrie. The extrudate material displayed a BET surface area of 487 $m^2/g$ and a bulk density of 0.413 g/ml.

Example 6

Selective Catalytic Reduction (SCR) Testing

Powder Tests

Prior to catalytic testing, the catalyst samples were aged in an aging reactor composed of a 1 mm thick steel tube (grade 1.4841 from Buhlmann Group) with 500 mm of height and 18 mm of internal diameter. A tube metal mantle based furnace was used to heat the reactor to the target reaction temperature which was monitored by an internal thermocouple at the location of the sample. The gas flow was saturated with water by heating of controlled amounts of water via a saturator. Water saturated gas flow was passed through a reactor from the bottom to top. The extrudates formed as described in Examples 1-4 and Comparative Examples 1 and 2 were hydrothermally aged in a tube furnace in a gas flow containing 10 percent $H_2O$, 10 percent $O_2$, balance $N_2$ at a space velocity of 12,500 $h^{-1}$ for 6 hours at 850° C.

The aged catalyst samples were then evaluated for selective catalytic reduction of NOx activity using the following reactor set up: the reactor is composed of a 1 mm thick quartz tube with 500 mm of height and 18 mm of internal diameter. An electric split tube furnaces was used to heat the reactor to the target reaction temperature which was monitored by an internal 4-point-thermocouple at the location of the sample. 2 g of the respectively aged samples from Examples 1-4 and Comparative Examples 1 and 2 were loaded into the reactor and secured with a plug of silica wool at each end of the sample. The sample weight is controlled by filling the empty reactor volume with an inert silica based material (Ceramtek AG—product # 1.080001.01.00.00; 0.5 to 1 mm—76 g at the bottom and 90 g at the top of the sample). An inlet gas mixture was formed containing 500 ppm NO, 500 ppm $NH_3$, 10 percent $O_2$, 5 percent $H_2O$ and balance He. The steam was prepared by heating of controlled amounts of water at 150 degrees centigrade through a steel presteamer (grade 1.4541 from Buhlmann, dimensions were 6 mm internal diameter and 900 mm length) before mixing with the remaining gases in a static mixer. This gas mixture then passed through a preheater set at 250 degrees centigrade and static mixer before entering the SCR reactor.

The DeNOx activity was measured under steady state conditions by measuring the NOx, $NH_3$ and $N_2O$ concentrations at the outlet using a FTIR spectrometer. Samples were tested at reaction temperatures of 200, 300, 450 and 600° C. and 400 L/h inlet gas flow. NO conversion (%) was then calculated as ([NO inlet concentration (ppm)—NO outlet concentration (ppm)]/NO inlet concentration (ppm)) *100. $N_2O$ make was also recorded as concentration in ppm. The results from the catalytic testing experiments are displayed in Table 1 below.

TABLE 1

Catalytic performance of the aged samples from Examples 1-4 and Comparative Examples 1 and 2 in selective catalytic reduction (SCR)

| | NO Conversion at 200° C. (%) | NO Conversion at 300° C. (%) | NO Conversion at 450° C. (%) | NO Conversion at 600° C. (%) |
|---|---|---|---|---|
| Comp. Ex. 1 | 91 | 95 | 86 | 37 |
| Example 1 | 92 | 96 | 90 | 46 |
| Example 2 | 96 | 99 | 95 | 54 |
| Example 3 | 73 | 95 | 87 | 52 |
| Comp. Ex. 2 | 96 | 100 | 91 | 45 |
| Example 4 | 90 | 96 | 94 | 67 |

Thus, as may be taken from the results displayed in Table 1, in some instances the catalysts according to the present invention display a somewhat lower $NO_x$ conversion activity than the comparative examples due to the presence of varying amounts of aluminum oxide or due to the presence of zirconium oxide therein, respectively, which accordingly dilute the catalyst activity to a given extent since the oxides themselves do not display any catalytic activity in this reaction. Quite surprisingly, however, strong synergestic effects are observed in the inventive samples between the metal oxide and zeolitic material. Thus, it has quite unexpectedly been found that the catalysts according to Examples 1 and 2 display a superior conversion activity at all tested temperatures compares to Comparative Example 1 which contains no metal oxide. Furthermore it has surprisingly been found that at higher conversion temperatures and in particular at 600° C., all of the inventive samples display clearly superior results in the selective catalytic reduction of $NO_x$ pared to the respective comparative examples containing the same zeolitic material yet no metal oxide.

Core Tests

For the core tests performed on a filter substrate coated with the inventive catalyst, a sample of the Cu-exchanged zeolite as obtained according to Comparative Example 2 was mixed with distilled water under continuous stirring until a homogeneous mixture was obtained, which was then milled. A slurry of Al-fumarate MOF from Reference Example 1 was then pre-milled to a D90 range of 4-6 μm, and subsequently blended with the the pre-milled zeolite slurry to obtain a final slurry containing 10 wt.-% Al-fumarate MOF, corresponding to an alumina loading of 3 wt.-%. The slurry was then coated on high porosity SiC filter (1.5"×5.54") by dipping in two passes with a drying step in between both passes, followed by calcination of the coated substrate at 450° C. For comparative purposes, the procedure was repeated without the use of Al-fumarate MOF. Washcoat loading for the Cu-CHA containing core was obtained as 2 g/in$^3$ and for the Cu-CHA/Al$_2$O$_3$ containing core was obtained as 1.9 g/in$^3$.

The coated filter samples were then aged in at 800° C. hydrothermally (20% O$_2$ and 10% steam) for 16 hours an oven under prior to performance evaluation. The ramp up phase to target aging temperature lasted 4 hours.

Figure 3:
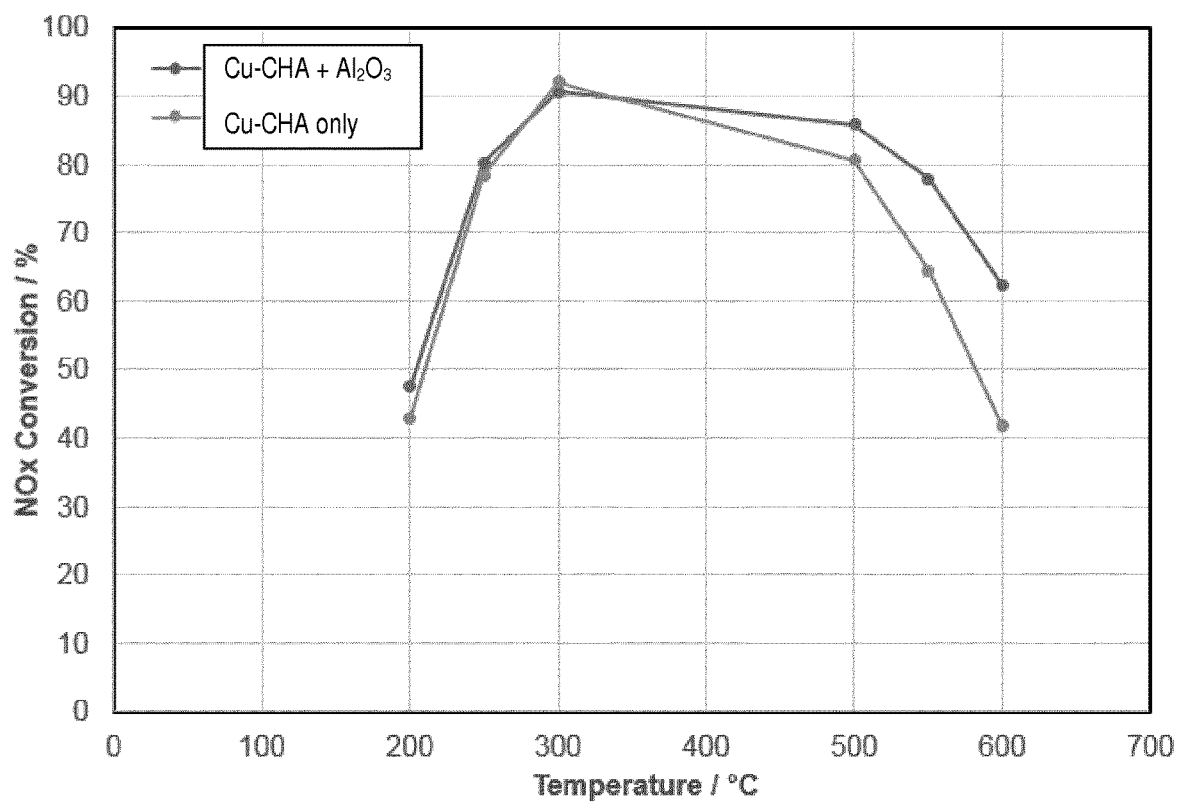
FIG. 3 shows results from comparative testing performed on coated filter substrates according to the core tests of Example 6, wherein the $NO_x$ conversion level in % is plotted along the ordinate and the testing temperature is shown along the abscissa.

For light-off (steady state) DeNOx evaluation, coated cores were evaluated using an NO-only SCR test with a feed gas composition of NO (450 ppm) and NH$_3$ (650 ppm) at flow rate of 100,000 h$^{-1}$. The results from catalyst testing are shown in FIG. 3. Thus, as may be taken from the results, the testing performed on the core samples confirm the surprising effects observed for the powder samples, wherein the inventive composite material displays comparable results at low temperature and quite unexpectedly affords a substantially increased SCR performance at higher temperatures.

Accordingly, it has quite unexpectedly been found according to the present invention that the combination of specific metal oxides with a zeolitic material, and in particular of mesoporous metal oxides which by themselves do not catalyze the selective catalytic reduction of NO with an SCR-active zeolitic material, leads to strong synergistic effects in view of the fact that the composite materials display improved conversion levels of NO$_x$, an effect which is particularly pronounced at high temperatures. Furthermore, it has quite unexpectedly been found that said effects may be observed in the catalyst composites after have been subject to a severe aging regimen, such that a highly improved catalyst may be provided not only with respect to the activity in the selective catalytic reduction of NO$_x$ as such, but furthermore with respect to the aging resistance of the catalyst.

The invention claimed is:

1. A catalyst, comprising:
 a composite material comprising an amorphous mesoporous material and a zeolite material,
 wherein the amorphous mesoporous material is chosen from amorphous mesoporous magnesium oxide, amorphous mesoporous aluminum oxide, amorphous mesoporous gallium oxide, amorphous mesoporous indium oxide, amorphous mesoporous titanium oxide, amorphous mesoporous zirconium oxide, amorphous mesoporous hafnium oxide, amorphous mesoporous copper oxide, amorphous mesoporous zinc oxide, amorphous iron magnesium oxide, amorphous mesoporous manganese oxide, amorphous mesoporous vanadium oxide, amorphous mesoporous cobalt oxide, and combinations thereof, and
 the zeolite material comprises a metal as a non-framework element.

2. A process for preparing the catalyst of claim 1, the process comprising:
 (i) preparing a mixture comprising:
 a metal-organic framework material comprising an ion of a metal or metalloid selected from groups 2-5, groups 7-9, and groups 11-14 of the Periodic Table of the Elements, and at least one at least monodentate organic compound,
 the zeolite material,
 optionally a solvent system, and
 optionally a pasting agent,
 (ii) calcining of the mixture obtained in (i)
 wherein the catalyst is the catalyst of claim 1.

3. The catalyst of claim 1, wherein the amorphous mesoporous material has an average pore size in a range of 3 to 10 nm based on a porosity measured in a range of 2 to 50 nm, wherein the average pore size is determined according to ISO 15901-2:2006.

4. The catalyst of claim 1, further comprising: a support substrate onto which the composite material is provided.

5. The catalyst of claim 4, wherein the support substrate is selected from the group consisting of a granule, a pellet, a mesh, a ring, a sphere, a cylinder, a hollow cylinder, a monolith and mixtures and combinations of two or more thereof.

6. The catalyst of claim 4, wherein the support substrate comprises a ceramic substance, a metallic substance, or both.

7. The catalyst of claim 4, wherein the support substrate comprises SiC.

8. The catalyst of claim 1, wherein the metal in the zeolite material is selected from the group consisting of the elements of groups 3 to 12 of the Periodic Table of the Elements, and combinations of two or more thereof.

9. The catalyst of claim 1, wherein the metal in the zeolite material is selected from the group consisting of Cu and Fe.

10. The catalyst of claim 1, wherein the metal in the zeolite material is introduced into the zeolite material by ion-exchange.

11. The catalyst of claim 1, wherein a metal and/or metalloid in the amorphous mesoporous material is selected from the group consisting of Al and Zr.

12. The catalyst of claim 1, wherein the zeolite material has a framework structure of a type selected from the group consisting of CHA and AEI.

13. The catalyst of claim 1, wherein the amorphous mesoporous material has an average pore size in a range of 3.8 to 4.2 nm based on a porosity measured in a range of 2 to 50 nm, wherein the average pore size is determined according to ISO 15901-2:2006.

14. A process for preparing the catalyst of claim 1, the process comprising:
 (i) preparing a mixture comprising:
 a metal-organic framework material comprising an ion of a metal or metalloid selected from groups 2-5, groups 7-9, and groups 11-14 of the Periodic Table of the Elements, and at least one at least monodentate organic compound,
 the zeolite material,
 a solvent system, and
 optionally a pasting agent;
 (i.A) homogenizing the mixture obtained in (i), to obtain a homogenized mixture;
 (i.B) providing a support substrate;
 (i.C) coating the support substrate provided in (i.B) with the homogenized mixture obtained in (i.A), to obtain a coated support substrate;

(i.D) optionally drying the coated support substrate obtained in (i.C), to obtain a dried coated support substrate;

(i.E) calcining of the coated support substrate obtained in (i.C) or the dried coated support substrate obtained in (i.D), wherein the catalyst is the catalyst of claim 1.

15. The process of claim 14, wherein the support substrate is selected from the group consisting of a granule, a pellet, a mesh, a ring, a sphere, a cylinder, a hollow cylinder, a monolith and mixtures and combinations of two or more thereof.

16. The process of claim 14, wherein the ion comprised in the metal-organic framework material is an ion of a metal selected from the group consisting of Mg, Al, Ga, In, Ti, Zr, Hf, Cu, Zn, Fe, Mn, V, Co and combinations of two or more thereof.

17. The process of claim 14, wherein the metal comprised in the zeolite material as the non-framework element is selected from the group consisting of the elements of groups 3 to 12 of the Periodic Table of the Elements, and combinations of two or more thereof.

18. A method for the selective catalytic reduction of NOx, the method comprising
   (1) providing a gas stream comprising NOx;
   (2) contacting the gas stream provided in (1) with the catalyst of claim 1.

19. A method for treating an exhaust gas, the method comprising contacting the exhaust gas with the catalyst of claim 1.

* * * * *